(12) United States Patent
Kim et al.

(10) Patent No.: US 10,334,474 B2
(45) Date of Patent: Jun. 25, 2019

(54) METHOD FOR CANCELLING INTERFERENCE IN WIRELESS COMMUNICATION SYSTEM AND DEVICE THEREFOR

(71) Applicant: LG ELECTRONICS INC., Seoul (KR)

(72) Inventors: Youngtae Kim, Seoul (KR); Kijun Kim, Seoul (KR); Hyungtae Kim, Seoul (KR); Jonghyun Park, Seoul (KR); Hanjun Park, Seoul (KR); Kunil Yum, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 377 days.

(21) Appl. No.: 15/027,213

(22) PCT Filed: Oct. 6, 2014

(86) PCT No.: PCT/KR2014/009380

§ 371 (c)(1),
(2) Date: Apr. 4, 2016

(87) PCT Pub. No.: WO2015/050418

PCT Pub. Date: Apr. 9, 2015

(65) Prior Publication Data

US 2016/0249250 A1 Aug. 25, 2016

Related U.S. Application Data

(60) Provisional application No. 61/886,656, filed on Oct. 4, 2013.

(51) Int. Cl.
*H04W 24/08* (2009.01)
*H04W 72/04* (2009.01)
(Continued)

(52) U.S. Cl.
CPC .......... *H04W 28/04* (2013.01); *H04B 1/7107* (2013.01); *H04B 7/0456* (2013.01);
(Continued)

(58) Field of Classification Search
CPC .............. H04B 1/7017; H04B 1/71072; H04B 1/71075; H04L 1/0014
See application file for complete search history.

(56) References Cited

U.S. PATENT DOCUMENTS

2012/0113844 A1 5/2012 Krishnamurthy
2014/0241274 A1* 8/2014 Lee ...................... H04L 5/0048
370/329
(Continued)

FOREIGN PATENT DOCUMENTS

KR 10-2013-0021903 * 9/2014
WO 2013133682 9/2013
(Continued)

OTHER PUBLICATIONS

Author Unknown, SIC receivers for NAICS, 3GPP TSG-RAN WG4 #66bis, Doc. No. R4-131826, Apr. 19, 2013, pp. 1-6.*
(Continued)

*Primary Examiner* — Christopher M Crutchfield
(74) *Attorney, Agent, or Firm* — Lee, Hong, Degerman, Kang & Waimey

(57) ABSTRACT

The present invention relates to a method and a device for cancelling interference of a terminal in a wireless communication system. More specifically, the method comprises the steps of: receiving information on N (N is a natural number) subbands of a neighboring cell; decoding an interference signal of the neighbor cell on the basis of the information on subbands of the neighbor cell; and cancelling the interference caused by the neighbor cell from a signal which is received from a serving cell, on the basis of the decoded interference signal, wherein the information on the subbands indicates a transmission mode TM of the neighbor cell.

9 Claims, 10 Drawing Sheets

(51) Int. Cl.
| | |
|---|---|
| *H04W 72/08* | (2009.01) |
| *H04J 11/00* | (2006.01) |
| *H04B 7/0456* | (2017.01) |
| *H04B 1/7107* | (2011.01) |
| *H04L 5/00* | (2006.01) |
| *H04L 1/00* | (2006.01) |
| *H04W 28/04* | (2009.01) |

(52) U.S. Cl.
CPC .......... *H04J 11/005* (2013.01); *H04L 1/0014* (2013.01); *H04L 5/00* (2013.01); *H04W 72/042* (2013.01); *H04W 72/082* (2013.01)

(56) References Cited

U.S. PATENT DOCUMENTS

2014/0293971 A1* 10/2014 Yoo .................... H04W 56/003 370/336
2015/0009964 A1* 1/2015 Ellenbeck ............ H04W 48/16 370/336

FOREIGN PATENT DOCUMENTS

WO 2013141624 9/2013
WO 2013147472 10/2013

OTHER PUBLICATIONS

Author Unknown, Network-Assisted IS/IC Receiver Structures, 3GPP TSG-RAN WG4 #66bis, Doc. No. R4-131325, Apr. 19, 2013, pp. 1-5.*
Author Unknown, Interference Suppression Framework for Network Assisted Interference Cancellation, 3GPP TSG RAN WG4 Meeting #66bis, Apr. 15, 2013.*
PCT International Application No. PCT/KR2014/009380, Written Opinion of the International Searching Authority dated Jan. 9, 2015, 20 pages.
Huawei, et al. "Obtain information of neighboring cells CRS", R1-120026, 3GPP TSG RAN WG1 Meeting #68, Feb. 2012, 2 pages.

* cited by examiner

FIG. 2
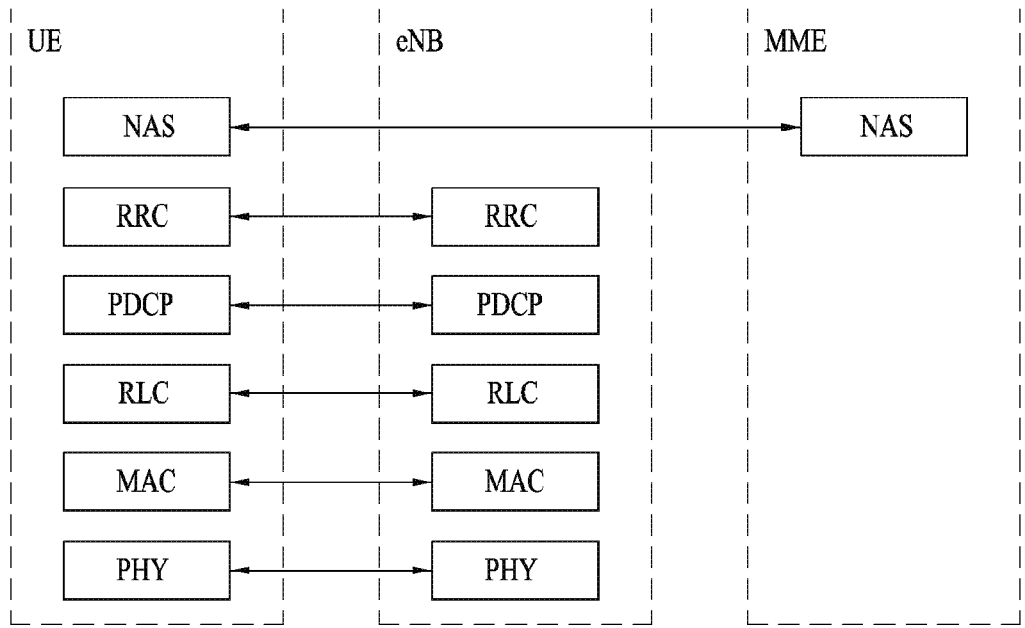
(a) control-plane protocol stack
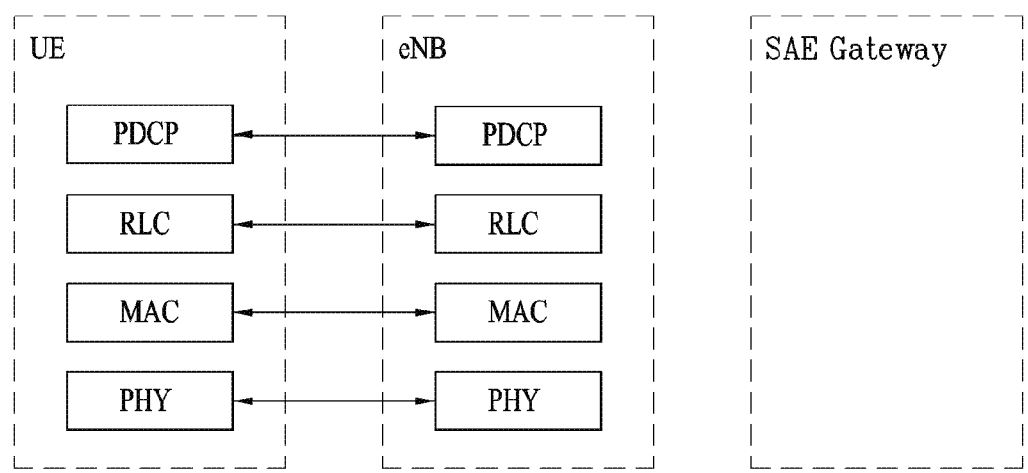
(b) user-plane protocol stack

METHOD FOR CANCELLING INTERFERENCE IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2014/009380, filed on Oct. 6, 2014, which claims the benefit of U.S. Provisional Application No. 61/886,656, filed on Oct. 4, 2013, the contents of which are all hereby incorporated by reference herein in their entirety.

TECHNICAL FIELD

The present invention relates to a wireless communication system, and more particularly, to a method for cancelling interference in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

The UE reports state information of a current channel to the base station periodically and/or non-periodically to assist efficient management of the wireless communication system. Since the reported channel state information may include the results calculated considering various statuses, a more efficient reporting method will be required.

DISCLOSURE

Technical Problem

Based on the aforementioned discussion, an object of the present invention is to provide a method for cancelling interference in a wireless communication system and a device therefor.

The technical problems solved by the present invention are not limited to the above technical problems and those skilled in the art may understand other technical problems from the following description.

Technical Solution

In one aspect of the present invention to achieve the above object, a method for cancelling interference of a user equipment in a wireless communication system comprises the steps of: receiving information on N (N is a natural number) subbands of a neighboring cell; decoding an interference signal of the neighboring cell on the basis of the information on the subbands of the neighboring cell; and cancelling the interference caused by the neighboring cell from a signal which is received from a serving cell, on the basis of the decoded interference signal, wherein the information on the subbands indicates a transmission mode TM of the neighboring cell.

Moreover, the information on the subbands is information for signaling at least one of information as to whether each subband is a CRS-based subband (Cell-specific Reference Signal-based subband), precoding information on each of the subbands, and rank information on each of the subbands.

Moreover, the information on the subbands is information for signaling a specific subband indicated by a DMRS-based subband (Demodulation Reference Signal-based subband), antenna port information of the neighboring cell corresponding to the specific subband, and DMRS sequence ID.

Moreover, the information on the subbands indicates only information on a specific transmission mode previously signaled in association with a CRS-based subband.

Moreover, the information on the subbands includes information for signaling whether at least one of precoding information, rank and transmission mode information, which are used for each of the subbands, has been changed.

Moreover, the information on the subbands includes signaling as to whether each subband is a CRS-based subband, and further includes signaling information indicating whether a corresponding signaling is the same as a previous signaling or a transmission mode.

Moreover, the information on the subbands further includes signaling information indicating whether the same transmission mode is used for all of CRS-based subbands.

Moreover, the information on the subbands includes signaling information indicating time information for which a configuration for a specific subband is maintained.

Moreover, the information on the subbands includes signaling information indicating that PMI (Precoding Matrix Index) is not defined for a specific subband.

Moreover, the transmission mode is indicated by a plurality of bits.

Moreover, the information on the subbands is transmitted through a physical downlink control channel (PDCCH) if a serving cell performs signaling, and is transmitted through an enhanced PDCCH (EPDCCH) if the neighboring cell performs signaling.

In another aspect of the present invention to achieve the above object, a user equipment for performing interference cancellation in a wireless communication system comprises a radio frequency unit; and a processor, wherein the processor is configured to receive information on N (N is a natural number) subbands of a neighboring cell, decode an interference signal of the neighboring cell on the basis of the information on the subbands of the neighboring cell and cancel the interference caused by the neighboring cell from a signal which is received from a serving cell, on the basis of the decoded interference signal, and the information on the subbands indicates a transmission mode TM of the neighboring cell.

Advantageous Effects

According to the embodiment of the present invention, interference cancellation can be supported effectively.

It will be appreciated by persons skilled in the art that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIG. 2 is a diagram showing a control plane and a user plane of a radio interface protocol between a UE and an E-UTRAN based on a 3rd generation partnership project (3GPP) radio access network standard.

BEST MODE FOR CARRYING OUT THE INVENTION

Figure 1:
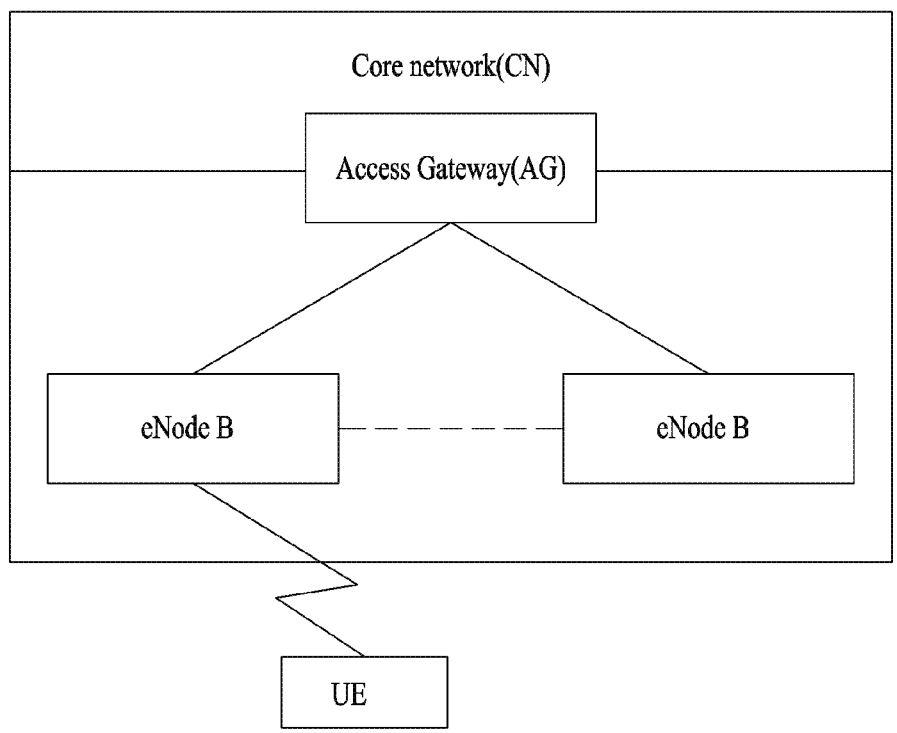
FIG. 1 is a diagram showing a network structure of an Evolved Universal Mobile Telecommunications System (E-UMTS) as an example of a wireless communication system.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A Radio Resource Control (RRC) located at a lowest portion of the third layer is defined only in the control plane.

The RRC layer handles logical channels, transport channels and physical channels for the configuration, re-configuration and release of Radio Bearers (RBs). Here, the RBs refer to services provided by the second layer, for data transfer between the UE and the network. The RRC layers of the UE and the network exchange RRC messages with each other. If the RRC layers of the UE and the network are RRC-connected, the UE is in an RRC connected mode and, if so not, is in an RRC idle mode. A Non-Access Stratum (NAS) layer located at a layer higher than the RRC layer performs a function such as session management and mobility management.

One cell configuring a base station (eNB) provides a downlink or uplink transmission service to several UEs using any one of bandwidths of 1.4, 3, 5, 10, 15 and 20 MHz. Different cells may be set to provide different bandwidths.

Examples of a downlink transport channel for transmitting data from the network to the UE include a Broadcast Channel (BCH) for transmitting system information, a Paging Channel (PCH) for transmitting a paging message, or a downlink Shared Channel (SCH) for transmitting user traffic or a control message. Traffic or a control message of a broadcast service or downlink multicast may be transmitted through the downlink SCH or a separate downlink Multicast Channel (MCH). Examples of an uplink transport channel for transmitting data from the UE to the network include a Random Access Channel (RACH) for transmitting an initial control message and an uplink SCH for transmitting user traffic or a control message. Examples of a logical channel located at a layer above the transport channel and mapped to the transport channel includes a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
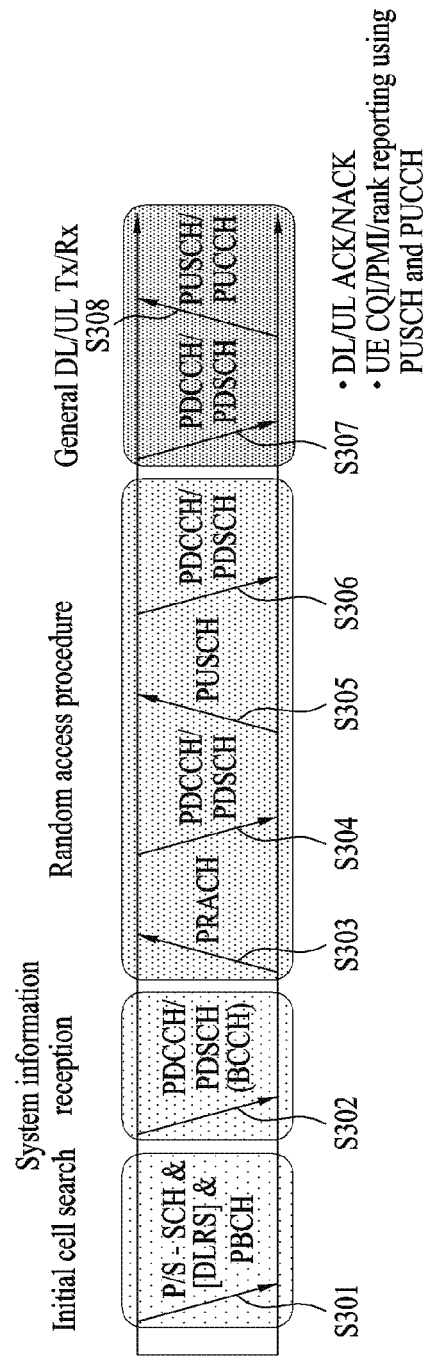
FIG. 3 is a diagram illustrating physical channels used in a 3GPP system and a general signal transmitting method using the same.

FIG. 3 is a diagram illustrating physical channels used in a 3GPP system and a general signal transmitting method using the same.

If a UE is powered on or newly enters a cell, the UE performs an initial cell search operation such as synchronization with a base station (S301). The UE receives a primary synchronization channel (P-SCH) and a secondary synchronization channel (S-SCH) from the base station so as to synchronize with the base station and to acquire information such as a cell ID. Thereafter, the UE may receive a physical broadcast channel from the base station so as to acquire a broadcast signal in the cell. The UE may receive a downlink reference signal (DL RS) so as to check a downlink channel state in the initial cell search step.

The UE, upon completion of initial cell search, may receive a Physical Downlink Control Channel (PDCCH) and a Physical Downlink Shared Channel (PDSCH) according to information carried in the PDCCH so as to acquire more detailed system information (S302).

When the UE initially accesses the base station or when radio resources for signal transmission are not present, the UE may perform a Random Access Procedure (RACH) with respect to the base station (steps S303 to S306). The UE may transmit a specific sequence using a preamble through a Physical Random Access Channel (PRACH) (S303 and S305) and receive a response message of the preamble through the PDCCH and the PDSCH corresponding thereto (S304 and S306). In the contention-based RACH, a contention resolution procedure may be additionally performed.

The UE which performs the above-described procedure may receive the PDCCH/PDSCH (S307) and transmit a Physical Uplink Shared Channel (PUSCH)/Physical Uplink Control Channel (PUCCH) (S308), as a general uplink/downlink signal transmission procedure. Specifically, the UE receives downlink control information (DCI) through the PDCCH. Here, the DCI includes control information such as resource allocation information for the UE, and has a different format depending on the use thereof.

Meanwhile, the information transmitted from the UE to the base station in uplink and transmitted from the base station to the UE may include a downlink/uplink ACK/NACK signal, a Channel Quality Indicator (CQI), a Precoding Matrix Index (PMI), a Rank Indicator (RI), etc. In the 3GPP LTE system, the UE may transmit the above-described information such as CQI/PMI/RI through the PUSCH and/or the PUCCH.

Figure 4:
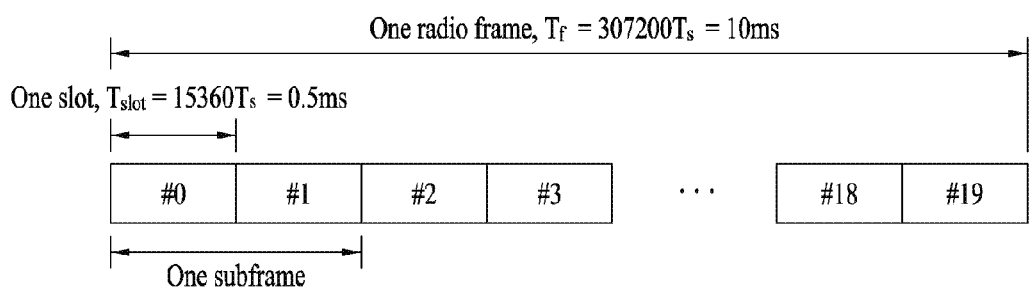
FIG. 4 illustrates exemplary radio frame structures in a LTE system.

FIG. 4 illustrates exemplary radio frame structures in a LTE system.

Referring to FIG. 4, a radio frame is 10 ms (307200 $T_s$) and divided into 10 equal-sized subframes. The 10 subframes of a radio frame may be indexed. Herein, $T_s$ represents a sampling time and $T_s=1/(2048*15$ kHz) (approximately, 33 ns). Each subframe is 1 ms long, including two slots. Each slot is 0.5 ms (15360 $T_s$) long. A slot includes a plurality of orthogonal frequency division multiplexing (OFDM) symbols in the time domain and a plurality of resource blocks (RBs) in the frequency time. In a LTE system, single resource block includes 12 (subcarriers)*7 (or 6) OFDM symbols. TTI (Transmission Time Interval), which is unit time for data transfer, can be defined by one or more subframes. The aforementioned structure of the radio frame is shown for exemplary purposes only. Thus, the number of subframes included in the radio frame or the number of slots included in the subframe or the number of OFDM symbols included in the slot may be modified in various manners.

Figure 5:
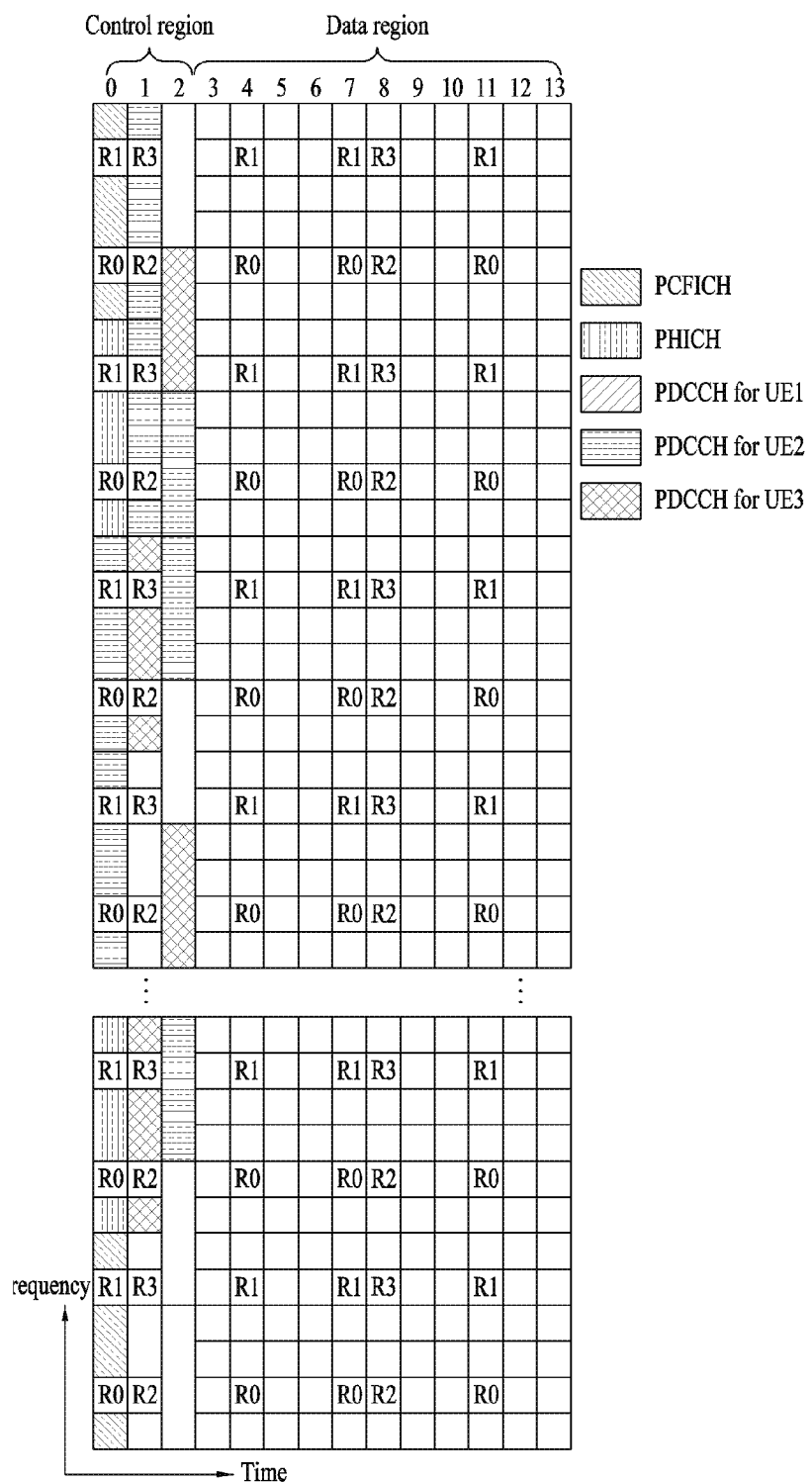
FIG. 5 illustrates a structure of a DL (DownLink) subframe in a LTE system.

FIG. 5 illustrates control channels included in a control region of one subframe in a downlink radio frame.

Referring to FIG. 5, the subframe consists of 14 OFDM symbols. Initial 1 to 3 OFDM symbols are used as the control region and the other 13 to 11 OFDM symbols are used as a data region depending on a subframe configuration. In this figure, R1 to R4 denote reference signals (RSs) (or pilot signals) for antennas 0 to 3. The RSs are fixed as a certain pattern in the subframe irrespective of the control region and the data region. The control channels are allocated to resources of the control region to which no RS is allocated, and traffic channels are allocated to resources of the data region to which no RS is allocated. The control channels allocated to the control region include a Physical Control Format Indicator Channel (PCFICH), a Physical HARQ (Hybrid-Automatic Repeat and Request) Indicator Channel (PHICH), a Physical Downlink Control Channel (PDCCH), etc.

The PCFICH signals the number of OFDM symbols used for the PDCCH in every subframe to the UE. The PCFICH is located in the first OFDM symbol and is configured prior to the PHICH and the PDCCH. The PCFICH consists of 4 resource element groups (REGs) each distributed over the control region based on cell identity (ID). One REG consists of 4 resource elements (REs). The RE refers to a minimum physical resource defined as one subcarrier×one OFDM symbol. The value of the PCFICH indicates one of values 1 to 3 or 2 to 4 depending on a bandwidth and is modulated through quadrature phase shift keying (QPSK).

The PHICH is used to carry HARQ ACK/NACK for uplink transmission. That is, the PHICH refers to a channel for transmitting DL ACK/NACK information for UL HARQ. The PHICH consists of 1 REG, and is scrambled cell-specifically. ACK/NACK is indicated using 1 bit, and is modulated through binary phase shift keying (BPSK). The modulated ACK/NACK is spread using a spreading factor (SF)=2 or 4. A plurality of PHICH channels mapped to the same resource form a PHICH group. The number of PHICH channels multiplexed into the PHICH group is determined depending on the number of spreading codes. The PHICH (group) is repeated 3 times to achieve diversity gain in the frequency domain and/or the time domain.

The PDCCH is allocated to initial n OFDM symbols of the subframe. Here, n is an integer equal to or greater than 1 and is indicated by the PCFICH. The PDCCH consists of one or more CCEs. The PDCCH signals information related to resource allocation of a Paging Channel (PCH) and a Downlink-Shared Channel (DL-SCH) which are transmission channels, uplink scheduling grant, HARQ information, etc. to each UE or UE group. The PCH and the DL-SCH are transmitted through a PDSCH. Accordingly, the base station and the UE generally transmit and receive data other than specific control information or specific service data through the PDSCH.

Information about a UE (or UEs) targeted by the data of the PDSCH, information about schemes for receiving and decoding the PDSCH data by the UEs, etc. are carried by the PDCCH. For example, it is assumed that a specific PDCCH is CRC-masked with radio network temporary identity (RNTI) "A" and information about data to be transmitted using radio resource (e.g., frequency location) "B" and DCI format (i.e., transmission format information (e.g., transmission block size, modulation scheme, coding information, etc.)) "C" is transmitted in a specific subframe. In this case, a UE within a cell monitors, i.e., blind-decodes, the PDCCH in a search area using RNTI information of the UE. If one or more UEs have RNTI "A", the UEs receive the PDCCH, and receive a PDSCH indicated by "B" and "C" using information of the received PDCCH.

Hereinafter, the DCI format will be described in more detail.

Each field in the DCI format is mapped into information bits $a_0, \ldots, a_{A-1}$. Each field is mapped in the order of the following description, and includes 0 bit padding (zero-padding). The first field is mapped into an information bit a0 of the smallest order, and subsequently, the respective fields are mapped into the information bits of the higher order. The most significant bit (MSB) of each field is mapped into the information bit of the smallest order for the corresponding field. For example, the most significant bit of the first field is mapped into a0.

In this case, for the serving cell configured for the UE, DCI formats 0, 1A, 3 and 3A may have the same payload size within a common search space, and the DCI formats 0 and 1A may have the same payload size within a UE-specific search space.

DCI Format 0

The DCI format 0 is used to schedule a PUSCH in one uplink cell.

Hereinafter, information transmitted through the DCI format 0 will be described.

1) A carrier indicator—includes 0 or 3 bits.

2) A flag for identifying the DCI format 0 from the DCI format 1A—includes 1 bit, wherein a value of 0 indicates the DCI format 0, and a value of 1 indicates the DCI format 1A.

3) A frequency hopping flag—includes 1 bit. This field may be used to allocate the most significant bit (MSB) of corresponding resource allocation to a multi-cluster if necessary.

4) Resource block assignment and hopping resource assignment—includes $\lceil \log_2 (N_{RB}^{DL}(N_{RB}^{DL}+1)/2) \rceil$ bits.

In this case, NUL_hop number of the most significant bits are used to acquire a value of $\tilde{n}_{PRB}$ (i) in case of PUSCH hopping in single-cluster allocation. $\lceil \log_2 (N_{RB}^{UL} (N_R^{BUL}+1)/2)\rceil - N_{UL\_hop}$ bits provide resource allocation of the first slot within an uplink subframe. Also, if there is no PUSCH hopping in the single-cluster allocation, $\lceil \log_2(N_R^{BUL} (N_{RB}^{UL}+1)/2 \rceil$ bits provide resource allocation within the uplink subframe. Also, if there is no PUSCH hopping in multi-cluster allocation, resource allocation information is obtained from concatenation of the frequency hopping field and the resource block assignment and hopping resource assignment field, and $$\left\lceil \log_2\left(\binom{\lceil N_{RB}^{UL}/P + 1 \rceil}{4}\right) \right\rceil$$

bits provide resource allocation within the uplink subframe. At this time, the value of P is determined by the number of downlink resource blocks.

5) A modulation and coding scheme (MCS)—includes 5 bits.

6) A new data indicator—includes 1 bit.

7) A transmit power control (TPC) command for PUSCH—includes 2 bits.

8) An index of cyclic shift (CS) for DMRS (demodulation reference signal) and orthogonal cover/orthogonal cover code (OC/OCC)—includes 3 bits.

9) An uplink index—includes 2 bits. This field exists in case of TDD operation only based on uplink-downlink configuration 0.

10) A downlink assignment index (DAI)—includes 2 bits. This field exists in case of TDD operation only based on uplink-downlink configurations 1 to 6.

11) A channel state information (CSI) request—includes 1 or 2 bits. In this case, 2-bit field is applied to only a case where corresponding DCI is mapped into a UE configured for which one or more downlink cells are configured, UE-specifically through cell-RNTI (C-RNTI).

12) A sounding reference signal (SRS) request—includes 0 or 1 bit. In this case, this field exists in only a case where a scheduling PUSCH is mapped UE-specifically through C-RNTI.

13) A multi-cluster flag—includes 1 bit.

If the number of information bits within the DCI format 0 is smaller than the payload size (including added padding bit) of the DCI format 1A, 0 is added to the DCI format 0 such that the DCI format 0 may be the same as the payload size of the DCI format 1A.

DCI Format 1

The DCI format 1 is used to schedule one PDSCH codeword in one cell.

Hereinafter, information transmitted through the DCI format 1 will be described.

1) A carrier indicator—includes 0 or 3 bits.

2) A resource allocation header—indicates resource allocation type 0 or 1, and includes 1 bit. If a downlink frequency band is the same as or smaller than 10 physical resource blocks (PRB), the resource allocation header does not exist and the resource allocation type 0 is assumed.

3) Resource block assignment—if the resource allocation type is 0, $\lceil N_{RB}^{DL}/P \rceil$ bits are provided for resource allocation. If the resource allocation type is 1, $\lceil \log_2(P) \rceil$ bits of this field are used as a header dedicated for the resource allocation type for indicating a selected resource block subset, and 1 bit is used to indicate a shift of resource allocation span.

Finally, ($\lceil N_{RB}^{DL}/P \rceil - \lceil \log_2(P) \rceil - 1$) bits provide resource allocation. At this time, the value of P is determined by the number of downlink resource blocks.

4) A modulation and coding scheme (MCS)—includes 5 bits.

5) A HARQ process number—includes 3 bits in FDD system and includes 4 bits in TDD system.

6) A new data indicator—includes 1 bit.

7) A redundancy version—includes 2 bit.

8) TPC command for PUCCH—includes 2 bits.

9) A downlink assignment index (DAI)—includes 2 bits. In this case, the downlink assignment index exists in the TDD system for all of the uplink-downlink configurations but is applied to TDD operation only based on uplink-downlink configurations 1 to 6. Also, this field does not exist in the FDD system.

If the number of information bits of the DCI format 1 is the same as that of the DCI format 0/1A, 1 bit having a value of 0 is added to the DCI format 1. On the other hand, if the number of information bits of the DCI format 1 belongs to a size set in Table 6 below, one or more of 0 bit may be added to the DCI format 1 until the payload size of the DCI format 1 is not the same as that of the DCI format 0/1A without belonging to Table 6.

Table 1 illustrates the size set of information bits.

TABLE 1

{12, 14, 16, 20, 24, 26, 32, 40, 44, 56}

DCI Format 1A

The DCI format 1A is used to schedule one PDSCH codeword in one cell. Also, the DCI format 1A is used for a random access procedure initiated by a PDCCH.

Hereinafter, information transmitted through the DCI format 1A will be described.

1) A carrier indicator—includes 0 or 3 bits.

2) A flag for identifying the DCI format 0 from the DCI format 1A—includes 1 bit, wherein a value of 0 indicates the DCI format 0, and a value of 1 indicates the DCI format 1A.

3) A localized/distributed virtual resource block (VRB) assignment flag—includes 1 bit.

4) Resource block assignment and hopping resource assignment—includes $\lceil \log_2(N_{RB}^{DL}(N_{RB}^{DL}+1)/2) \rceil$ bits.

In this case, $\lceil \log_2(N_{RB}^{DL}(N_{RB}^{DL}+1)/2) \rceil$ bits are provided for resource allocation in case of the localized virtual resource block.

In case of the distributed virtual resource block, if a downlink resource block indicating downlink frequency band configuration is less than 50 ($N_{RB}^{DL}<50$), or if a DCI format 1A CRC is scrambled with RA-RNTI (random access-RNTI), P-RNTI (Paging-RNTI) or SI-RNTI (system information RNTI), $\lceil \log_2(N_{RB}^{DL}(N_{RB}^{DL}+1)/2) \rceil$ bits are provided for resource allocation. On the other hand, in other cases, 1 bit which is the MSB (Most Significant Bit) indicates a gap value for distribution when the virtual resource block is mapped into a physical resource block. In this case, if the value is 0, it indicates $N_{gap}=N_{gap,1}$, and if the value is 1, it indicates $N_{gap}=N_{gap,2}$ ($\lceil \log_2(N_{RB}^{DL}(N_{RB}^{DL}+1)/2) \rceil - 1$) bits are provided for resource allocation.

5) A modulation and coding scheme (MCS)—includes 5 bits.

6) A HARQ process number—includes 3 bits in FDD system and includes 4 bits in TDD system.

7) A new data indicator—includes 1 bit.

The new data indicator may be varied depending on whether a virtual DCI format 1A CRC is scrambled with RA-RNTI, P-RNTI or SI-RNTI.

The case where the virtual DCI format 1A CRC is scrambled with RA-RNTI, P-RNTI or SI-RNTI will be described. If a downlink resource block is more than 50 $N_{RB}^{DL} \geq 50$, or if a localized/distributed virtual resource block assignment flag is set to 1, the new data indicator indicates a gap value. At this time, if the value is 0, the new data indicator indicates $N_{gap}=N_{gap,1}$, and if the value is 1, the new data indicator indicates $N_{gap}=N_{gap,2}$. However, if not so, the new data indicator is reserved.

On the other hand, if the virtual DCI format 1A CRC is not scrambled with RA-RNTI, P-RNTI or SI-RNTI, the new data indicator may be set previously.

8) A redundancy version—includes 2 bits.

9) A TPC command for PUCCH—includes 2 bits.

In this case, if the DCI format 1A CRC is scrambled with RA-RNTI, P-RNTI or SI-RNTI, the MSB of the TPC command is reserved, and the least significant bit (LSB) of the TPC command indicates a column according to the value of $N_{PRB}^{1A}$ in a Table indicating a transport block size (TBS). At this time, if the LSB is 0, $N_{PRB}^{1A}$ is equal to 2, and if not so, $N_{PRB}^{1A}$ is equal to 3.

On the other hand, if the DCI format 1A CRC is not scrambled with RA-RNTI, P-RNTI or SI-RNTI, 2 bits including the MSB indicate the TPC command.

10) A downlink assignment index—includes 2 bits. In this case, the downlink assignment index exists in the TDD system for all of the uplink-downlink configurations but is applied to the TDD operation having the uplink-downlink configurations 1 to 6. Also, this field does not exist in the FDD system.

11) A sounding reference signal (SRS) request—includes 0 or 1 bit. In this case, this field exists in only a case where a scheduling PUSCH is mapped UE-specifically through C-RNTI.

If the number of information bits within the DCI format 1A is smaller than that within the DCI format 0, a value of 0 may be appended to the information bits within the DCI format 1A until the information bits within the DCI format 1A have the same payload. Also, if the number of information bits of the DCI format 1A belongs to a size set in Table 1 above, one 0 bit may be appended to the DCI format 1A.

Meanwhile, if the DCI format 1A CRC is scrambled with RA-RNTI, P-RNTI or SI-RNTI, the fields corresponding to the HARQ process number and the downlink assignment index of the aforementioned fields may be reserved.

On the other hand, if the DCI format 1A is scrambled with C-RNTI, the DCI format 1A is used for a random access procedure initiated by the PDCCH. At this time, the DCI format 1A is configured as follows.

1) A localized/distributed virtual resource block (VRB) assignment flag—includes 1 bit, and is set to 0.

2) A resource block assignment includes $\lceil \log_2(N_{RB}^{DL}(N_{RB}^{DL}+1)/2) \rceil$ bits, all of which are set to 1.

3) A preamble index—includes 6 bits.

4) A physical random access channel (PRACH) mask index—includes 4 bits.

In addition, all of the remaining bits are set to 0.

DCI Format 1B

The DCI format 1B is used for compact scheduling of one PDSCH codeword together with precoding information in one cell.

Hereinafter, information transmitted through the DCI format 1B will be described.

1) A carrier indicator—includes 0 or 3 bits.
2) A localized/distributed virtual resource block (VRB) assignment flag—includes 1 bit.
3) A resource block assignment includes $\lceil \log_2 (N_{RB}^{DL}(N_{RB}^{DL}+1)/2) \rceil$ bits.

In this case, $\lceil \log_2(N_{RB}^{DL}(N_{RB}^{DL}+1)/2) \rceil$ bits are provided for resource allocation in case of the localized virtual resource block.

In case of the distributed virtual resource block, if a downlink resource block indicating downlink frequency band configuration is less than 50 ($N_{RB}^{DL}<50$), $\lceil \log_2 (N_{RB}^{DL}(N_{RB}^{DL}+1)/2) \rceil$ bits are provided for resource allocation. On the other hand, if the downlink resource block is more than 50 ($N_{RB}^{DL} \geq 50$), 1 bit which is the MSB indicates a gap value for distribution when the virtual resource block is mapped into the physical resource block. In this case, if the value is 0, it indicates $N_{gap}=N_{gap,1}$, and if the value is 1, it indicates $N_{gap}=N_{gap,2}$. And, $(\lceil \log_2(N_{RB}^{DL}(N_{RB}^{DL}+1)/2) \rceil -1)$ bits are provided for resource allocation.

4) A modulation and coding scheme (MCS)—includes 5 bits.
5) A HARQ process number—includes 3 bits in FDD system and includes 4 bits in TDD system.
6) A new data indicator—includes 1 bit.
7) A redundancy version—includes 2 bits.
8) A TPC command for PUCCH—includes 2 bits.
9) A downlink assignment index—includes 2 bits. In this case, the downlink assignment index exists in the TDD system for all of the uplink-downlink configurations but is applied to the TDD operation having the uplink-downlink configurations 1 to 6. Also, this field does not exist in the FDD system.
10) Transmitted precoding matrix indicator (TPMI) information for precoding—the number of bits is determined as illustrated in Table 2 below.

Table 2 illustrates the number of bits for TPMI information.

TABLE 2

| Number of antenna ports at eNodeB | Number of bits |
|---|---|
| 2 | 2 |
| 4 | 4 |

The TPMI inforamtion indicates a codebook index used in case of single layer transmission.

11) Precoding matrix indicator (PMI) confirmation for precoding—includes 1 bit, and indicates a message as illustrated in Table 3 below.

Table 3 illustrates contents of PMI confirmation.

TABLE 3

| Bit field mapped to index | Message |
|---|---|
| 0 | Precoding according to the indicated TPMI in the TPMI information field |
| 1 | Precoding according to the latest PMI report on PUSCH using the precoder(s) indicated by the reported PMI(s) |

If the PMI confirmation field indicates that the base station applies precoding in accordance with PMI reported by the UE, precoding for a corresponding resource block at the nth subframe does not depend on PUCCH at the corresponding subframe or the n−4th subframe, and depends on the latest PMI on the PUSCH, which is reported by the UE.

If the number of information bits of the DCI format 1B belongs to one of a size set of Table 6 above, one 0 bit may be appended to the DCI format 1B.

DCI Format 1C

The DCI format 1C is used for very compact scheduling of one PDSCH codeword, and is also used to report a change of a multicast control channel (MCCH).

Hereinafter, information transmitted through the DCI format 1C will be described.

First of all, the case where the DCI format 1C is used for very compact scheduling of one PDSCH codeword will be described.

1) 1 bit indicates a gap value for distribution when a virtual resource block is mapped into a physical resource block. In this case, if the value is 0, it indicates $N_{gap}=N_{gap,1}$, and if the value is 1, it indicates $N_{gap}=N_{gap,2}$.
2) If a downlink resource block is less than 50 ($N_{RB}^{DL}<50$), bits for indicating a gap do not exist.
3) A resource block assignment—includes $\lceil \log_2 (\lfloor N_{VRB,gap1}^{DL}/N_{RB}^{step} \rfloor \cdot (\lfloor N_{VRB,gap1}^{DL}/N_{RB}^{step} \rfloor+1)/2) \rceil$ bits.
4) A modulation and coding scheme (MCS)—includes 5 bits.

Next, the case where the DCI format 1C is used to report the change of the MCCH will be described. Information for reporting the change of the MCCH includes 8 bits, and reserved information bits are added until the DCI format 1C has the same size as that obtained when the DCI format 1C is used for very compact scheduling of one PDSCH codeword.

DCI Format 1D

The DCI format 1D is used for compact scheduling of one PDSCH codeword together with precoding information and power offset information in one cell.

Hereinafter, information transmitted through the DCI format 1D will be described.

1) A carrier indicator—includes 0 or 3 bits.
2) A localized/distributed virtual resource block (VRB) assignment flag—includes 1 bit.
4) A resource block assignment—includes $\lceil \log_2(N_{RB}^{DL}(N_{RB}^{DL}+1)/2) \rceil$ bits.

In this case, $\lceil \log_2(N_{RB}^{DL}(N_{RB}^{DL}+1)2) \rceil$ bits are provided for resource allocation in case of the localized virtual resource block.

In case of the distributed virtual resource block, if a downlink resource block indicating downlink frequency band configuration is less than 50 ($N_{RB}^{DL}<50$), $\lceil \log_2(N_{RB}^{DL}(N_{RB}^{DL}+1)/2) \rceil$ bits are provided for resource allocation. On the other hand, if the downlink resource block is more than 50 ($N_{RB}^{DL} \geq 50$), 1 bit which is the MSB indicates a gap value for distribution when a virtual resource block is mapped into a physical resource block. In this case, if the value is 0, it indicates $N_{gap}=N_{gap,1}$, and if the value is 1, it indicates $N_{gap}=N_{gap,2}$. And, $(\lceil \log_2(N_{RB}^{DL}(N_{RB}^{DL}+1)/2) \rceil -1)$ bits are provided for resource allocation.

4) A modulation and coding scheme (MCS)—includes 5 bits.
5) A HARQ process number—includes 3 bits in FDD system and includes 4 bits in TDD system.
6) A new data indicator—includes 1 bit.
7) A redundancy version—includes 2 bits.
8) A TPC command for PUCCH—includes 2 bits.
9) A downlink assignment index—includes 2 bits. In this case, the downlink assignment index exists in the TDD system for all of the uplink-downlink configurations but is applied to the TDD operation having the uplink-downlink configurations 1 to 6. Also, this field does not exist in the FDD system.

10) Transmitted precoding matrix indicator (TPMI) information for precoding—the number of bits is determined as illustrated in Table 4 below.

Table 4 illustrates the number of bits for TPMI information.

TABLE 4

| Number of antenna ports at eNodeB | Number of bits |
|---|---|
| 2 | 2 |
| 4 | 4 |

The TPMI information indicates a codebook index used in case of single layer transmission.

11) Downlink power offset—includes 1 bit.

If the number of information bits of the DCI format 1D belongs to the size set in Table 1 above, one 0 bit may be appended to the DCI format 1D.

DCI Format 2

The DCI format 2 is used for PDSCH scheduling in a closed-loop spatial multiplexing mode.

Hereinafter, information transmitted through the DCI format 2 will be described.

1) A carrier indicator—includes 0 or 3 bits.

2) A resource allocation header—indicates resource allocation type 0 or 1, and includes 1 bit. If a downlink frequency band is the same as or smaller than 10 physical resource blocks (PRB), the resource allocation header does not exist and the resource allocation type 0 is assumed.

3) Resource block assignment—if the resource allocation type is 0, $\lceil N_{RB}^{DL}/P \rceil$ bits are provided for resource allocation. If the resource allocation type is 1, $\lceil \log_2(P) \rceil$ bits of this field are used as a header dedicated for the resource allocation type for indicating a selected resource block subset, and 1 bit is used to indicate a shift of resource allocation span. Finally, $\lceil N_{RB}^{DL}/P \rceil - \lceil \log_2(P) \rceil - 1$) bits provide resource allocation.

At this time, the value of P is determined by the number of downlink resource blocks.

4) A TPC command for PUCCH—includes 2 bits.

5) A downlink assignment index (DAI)—includes 2 bits. In this case, the downlink assignment index exists in the TDD system for all of the uplink-downlink configurations but is applied to TDD operation only based on uplink-downlink configurations 1 to 6. Also, this field does not exist in the FDD system.

6) A HARQ process number—includes 3 bits in the FDD system and includes 4 bits in the TDD system.

7) A swap flag to a codeword of a transport block—includes 1 bit.

8) A modulation and coding scheme (MCS)—includes 5 bits per transport block.

9) A new data indicator—includes 1 bit per transport block.

10) A redundancy version—includes 2 bits per transport block.

11) Precoding information—the number of bits is determined as illustrated in Table 5 below.

Table 5 illustrates the number of bits for precoding information.

TABLE 5

| Number of antenna ports at eNodeB | Number of bits for precoding information |
|---|---|
| 2 | 3 |
| 4 | 6 |

If two transport blocks are all enabled, mapping of the transport block into the codeword is as illustrated in Table 6 below, and if only one transport block is enabled, mapping of the transport block into the codeword is as illustrated in Table 7 below.

Table 6 illustrates mapping of the transport block into the codeword if the two transport blocks are enabled.

TABLE 6

| transport block to codeword swap flag value | codeword 0 (enabled) | codeword 1 (enabled) |
|---|---|---|
| 0 | transport block 1 | transport block 2 |
| 1 | transport block 2 | transport block 1 |

Table 7 illustrates mapping of the transport block into the codeword if only one transport block is enabled.

TABLE 7

| transport block 1 | transport block 2 | codeword 0 (enabled) | codeword 1 (disabled) |
|---|---|---|---|
| enabled | disabled | transport block 1 | — |
| disabled | enabled | transport block 2 | — |

The precoding information field is defined as illustrated in Table 8 and Table 9 below.

Table 8 illustrates contents of the precoding information field for 2 antenna ports.

TABLE 8

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 2 layers: Transmit diversity | 0 | 2 layers: Precoding corresponding to precoder matrix $\frac{1}{2}\begin{bmatrix} 1 & 1 \\ 1 & -1 \end{bmatrix}$ |

TABLE 8-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 1 | 1 layer: Precoding corresponding to precoding vector $[1\ 1]^T/\sqrt{2}$ | 1 | 2 layers: Precoding corresponding to precoder matrix $\frac{1}{2}\begin{bmatrix} 1 & 1 \\ j & -j \end{bmatrix}$ |
| 2 | 1 layer: Precoding corresponding to precoder vector $[1\ -1]^T/\sqrt{2}$ | 2 | 2 layers: Precoding according to the latest PMI report on PUSCH, using the precoder(s) indicated by the reported PMI(s) |
| 3 | 1 layer: Precoding corresponding to precoder vector $[1\ j]^T/\sqrt{2}$ | 3 | reserved |
| 4 | 1 layer: Precoding corresponding to precoder vector $[1\ -j]^T/\sqrt{2}$ | 4 | reserved |
| 5 | 1 layer: Precoding according to the latest PMI report on PUSCH, using the precoder(s) indicated by the reported PMI(s), if RI = 2 was reported, using $1^{st}$ column multiplied by $\sqrt{2}$ of all precoders implied by the reported PMI(s) | 5 | reserved |
| 6 | 1 layer: Precoding according to the latest PMI report on PUSCH, using the precoder(s) indicated by the reported PMI(s), if RI = 2 was reported, using $2^{nd}$ column multiplied by $\sqrt{2}$ of all precoders implied by the reported PMI(s) | 6 | reserved |
| 7 | reserved | 7 | reserved |

Table 9 illustrates contents of the precoding information field for 4 antenna ports.

TABLE 9

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | • | • |
| • | • | • | • |
| • | • | • | • |
| • | • | 15 | 2 layers: TPMI = 15 |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | • | • |
| • | • | • | • |
| • | • | 32 | 3 layers: TPMI = 15 |
| • | • | | |
| • | • | | |

TABLE 9-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |
| 35-63 | reserved | 35 | 4 layers: TPMI = 1 |
| | | ⋮ | ⋮ |
| | | 49 | 4 layers: TPMI = 15 |
| | | ⋮ | ⋮ |
| | | 50 | 4 layers: Precoding according to the latest PMI report on PUSCH using the precoder(s) indicated by the reported PMI(s) |
| | | 51-63 | Reserved |

In this case, the TPMI information indicates a codebook index in case of single layer transmission.

In case of an enabled single codeword, if a previous transport block is transmitted using two layers in accordance with closed-loop spatial multiplexing, indexes 18 to 34 included in Table 9 are only supported for retransmission of the corresponding transport block.

If the number of information bits within the DCI format 2 belongs to the size set of Table 1 above, one 0 bit may be appended to the DCI format 2.

A specific entry illustrated in Table 8 and Table 9 above may be used by the base station to indicate that precoding is applied in accordance with PMI reported by the UE. In this case, precoding for a corresponding resource block at the nth subframe does not depend on PUCCH at the corresponding subframe or the n−4th subframe, and depends on the latest PMI on the PUSCH, which is reported by the UE.

DCI Format 2A

The DCI format 2A is used for PDSCH scheduling in an open-loop spatial multiplexing mode.

Hereinafter, information transmitted through the DCI format 2A will be described.

1) A carrier indicator—includes 0 or 3 bits.

2) A resource allocation header—indicates resource allocation type 0 or 1, and includes 1 bit. If a downlink frequency band is the same as or smaller than 10 physical resource blocks (PRB), the resource allocation header does not exist and the resource allocation type 0 is assumed.

3) Resource block assignment—if the resource allocation type is 0, $\lceil N_{RB}^{DL}/P \rceil$ bits are provided for resource allocation. If the resource allocation type is 1, $\lceil N_{RB}^{DL}/P \rceil$ bits of this field are used as a header dedicated for the resource allocation type for indicating a selected resource block subset, and 1 bit is used to indicate a shift of resource allocation span. Finally, $\lceil N_{RB}^{DL}/P \rceil - \lceil \log_2(P) \rceil - 1$ bits provide resource allocation.

At this time, the value of P is determined by the number of downlink resource blocks.

4) A TPC command for PUCCH—includes 2 bits.

5) A downlink assignment index (DAI)—includes 2 bits. In this case, the downlink assignment index exists in the TDD system for all of the uplink-downlink configurations but is applied to TDD operation only based on uplink-downlink configurations 1 to 6. Also, this field does not exist in the FDD system.

6) A HARQ process number—includes 3 bits in the FDD system and includes 4 bits in the TDD system.

7) A swap flag to a codeword of a transport block—includes 1 bit.

8) A modulation and coding scheme (MCS)—includes 5 bits per transport block.

9) A new data indicator—includes 1 bit per transport block.

10) A redundancy version—includes 2 bits per transport block.

11) Precoding information—the number of bits is determined as illustrated in Table 10 below.

Table 10 illustrates the number of bits for precoding information.

TABLE 10

| Number of antenna ports at eNodeB | Number of bits for precoding information |
|---|---|
| 2 | 0 |
| 4 | 2 |

If two transport blocks are all enabled, mapping of the transport block into the codeword is as illustrated in Table 6 above, and if only one transport block is enabled, mapping of the transport block into the codeword is as illustrated in Table 7 above.

The precoding information field is defined as illustrated in Table 11 below.

Table 11 illustrates contents of the precoding information field for 4 antenna ports.

TABLE 11

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: precoder cycling with large delay CDD |
| 1 | 2 layers: precoder cycling with large delay CDD | 1 | 3 layers: precoder cycling with large delay CDD |
| 2 | reserved | 2 | 4 layers: precoder cycling with large delay CDD |
| 3 | reserved | 3 | reserved |

In case of an enabled single codeword, if a previous transport block is transmitted using two layers in accordance with cyclic delay diversity (CDD) having large delay, index 1 included in Table 11 is only supported for retransmission of the corresponding transport block.

The precoding information field for two antenna ports does not exist. If two codewords are enabled, the number of transport layers is 2 and codeword 1 is disabled. If codeword 0 is enabled, transmission diversity is used.

If the number of information bits within the DCI format 2A belongs to the size set of Table 1 above, one 0 bit may be appended to the DCI format 2A.

DCI Format 2B

Hereinafter, information transmitted through the DCI format 2B will be described.

1) A carrier indicator—includes 0 or 3 bits.
2) A resource allocation header—indicates resource allocation type 0 or 1, and includes 1 bit. If a downlink frequency band is the same as or smaller than 10 physical resource blocks (PRB), the resource allocation header does not exist and the resource allocation type 0 is assumed.
3) Resource block assignment—if the resource allocation type is 0, $\lceil \log_2(P) \rceil$ bits are provided for resource allocation. If the resource allocation type is 1, $\lceil \log_2(P) \rceil$ bits of this field are used as a header dedicated for the resource allocation type for indicating a selected resource block subset, and 1 bit is used to indicate a shift of resource allocation span. Finally, $\lceil \log_2(P) \rceil - \lceil \log_2(P) \rceil - 1$) bits provide resource allocation. At this time, the value of P is determined by the number of downlink resource blocks.
4) A TPC command for PUCCH—includes 2 bits.
5) A downlink assignment index (DAI)—includes 2 bits. In this case, the downlink assignment index exists in the TDD system for all of the uplink-downlink configurations but is applied to TDD operation only based on uplink-downlink configurations 1 to 6. Also, this field does not exist in the FDD system.
6) A HARQ process number—includes 3 bits in the FDD system and includes 4 bits in the TDD system.
7) A scrambling identity—includes 1 bit.
8) A sounding reference signal (SRS) request—includes 0 or 1 bit. In this case, this field exists in the TDD system only.
9) A modulation and coding scheme (MCS)—includes 5 bits per transport block.
10) A new data indicator—includes 1 bit per transport block.
11) A redundancy version—includes 2 bits per transport block.

If two transport blocks are all enabled, the number of layers is 2. The transport block 1 is mapped into codeword 0, and the transport block 2 is mapped into codeword 1. Antenna ports 7 and 8 are used for spatial multiplexing.

If one transport block is disabled, the number of layers is 1. Mapping of the transport block into the codeword is as illustrated in Table 7 above. And, antenna port for single antenna port transmission is as illustrated in Table 12 below.

Table 12 illustrates antenna port for single antenna port transmission if one transport block is disabled.

TABLE 12

| New data indicator of the disable transport block | Antenna port |
|---|---|
| 0 | 7 |
| 1 | 8 |

If the number of information bits within the DCI format 2B belongs to the size set of Table 1 above, one 0 bit may be appended to the DCI format 2B.

DCI Format 2C

Hereinafter, information transmitted through the DCI format 2C will be described.

1) A carrier indicator—includes 0 or 3 bits.
2) A resource allocation header—indicates resource allocation type 0 or 1, and includes 1 bit. If a downlink frequency band is the same as or smaller than 10 physical resource blocks (PRB), the resource allocation header does not exist and the resource allocation type 0 is assumed.
3) Resource block assignment—if the resource allocation type is 0, $\lceil N_{RB}^{DL}/P \rceil$ bits are provided for resource allocation. If the resource allocation type is 1, $\lceil N_{RB}^{DL}/P \rceil$ bits of this field are used as a header dedicated for the resource allocation type for indicating a selected resource block subset, and 1 bit is used to indicate a shift of resource allocation span. Finally, $\lceil N_{RB}^{DL}/P \rceil - \lceil N_{RB}^{DL}/P \rceil - 1$) bits provide resource allocation.

At this time, the value of P is determined by the number of downlink resource blocks.

4) A TPC command for PUCCH—includes 2 bits.
5) A downlink assignment index (DAI)—includes 2 bits. In this case, the downlink assignment index exists in the TDD system for all of the uplink-downlink configurations but is applied to TDD operation only based on uplink-downlink configurations 1 to 6. Also, this field does not exist in the FDD system.
6) A HARQ process number—includes 3 bits in the FDD system and includes 4 bits in the TDD system.
7) Antenna port, scrambling identity—includes 3 bits in accordance with Table 13 below. In this case, nSCID indicates scrambling identity for antenna ports 7 and 8.

Table 13 illustrates the number of antenna ports, scrambling identities and layers.

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

8) A sounding reference signal (SRS) request—includes 0 or 1 bit. In this case, this field may exist in the TDD system only.

9) A modulation and coding scheme (MCS)—includes 5 bits per transport block.

10) A new data indicator—includes 1 bit per transport block.

11) A redundancy version—includes 2 bits per transport block.

If two transport blocks are enabled, the transport block 1 is mapped into codeword 0, and the transport block 2 is mapped into codeword 1.

If one transport block is disabled, the number of layers is 1. Mapping of the transport block into the codeword is as illustrated in Table 7 above. If one codeword is enabled, a previous transport block is transmitted using 2, 3 and 4 layers. In Table 13, values of 4, 5 and 6 are only supported for retransmission of the corresponding transport block.

If the number of information bits within the DCI format 2C belongs to the size set of Table 1 above, one 0 bit may be appended to the DCI format 2C.

DCI Format 3

The DCI format 3 is used for transmission of a TPC command for PUCCH and PUSCH based on power adjustment of 2 bits.

Hereinafter, information transmitted through the DCI format 3 will be described.

1) TPC command number 1, TPC command number 2, . . . , TPC command number N—are equal to $$N = \left\lfloor \frac{L_{format0}}{2} \right\rfloor.$$

And, $L_{format0}$ is equal to the payload size of the DCI format 0 before padding bit is appended and CRC is attached. A parameter 'tpc-Index' provided by an upper layer determines an index of a TPC command for a UE. At this time, in case of $$\left\lfloor \frac{L_{format0}}{2} \right\rfloor < \frac{L_{format0}}{2},$$

bits corresponding to a value of 0 may be appended to the DCI format 3.

DCI Format 3A

The DCI format 3A is used for transmission of a TPC command for PUCCH and PUSCH based on power adjustment of 1 bit.

Hereinafter, information transmitted through the DCI format 3A will be described.

1) TPC command number 1, TPC command number 2, . . . , TPC command number M—are equal to $M=L_{format0}$. And, $L_{format0}$ is equal to the payload size of the DCI format 0 before padding bit is appended and CRC is attached. A parameter 'tpc-Index' provided by an upper layer determines an index of a TPC command for a UE.

DCI Format 4

The DCI format 4 is used for PUSCH scheduling within one uplink cell in a multi-antenna port transmission mode.

Hereinafter, information transmitted through the DCI format 4 will be described.

1) A carrier indicator—includes 0 or 3 bits.

2) Resource block assignment and hopping resource assignment—includes $$\left\lceil \log_2\left( \binom{\lceil N_{RB}^{UL}/P + 1 \rceil}{4} \right) \right\rceil.$$

At this time, the value of P is determined by the number of downlink resource blocks.

In this case, ($\lceil \log_2(N_{RB}^{UL}(N_{RB}^{UL}+1)/2) \rceil$) number of the LSBs are provided for resource allocation at an uplink subframe in case of single-cluster allocation. On the other hand, all of bits of this field are provided for resource allocation at the uplink subframe in case of multi-cluster allocation.

3) A transmit power control (TPC) command for PUSCH

4) An index of cyclic shift (CS) for DMRS and orthogonal cover/orthogonal cover code (OC/OCC)—includes 3 bits.

5) An uplink index—includes 2 bits. This field exists in case of TDD operation only based on uplink-downlink configuration 0.

6) A downlink assignment index (DAI)—includes 2 bits. This field exists in case of TDD operation only based on uplink-downlink configurations 1 to 6.

7) A channel state information (CSI) request—includes 1 or 2 bits. In this case, 2-bit field is applied to a UE only for which one or more downlink cells are configured.

8) A sounding reference signal (SRS) request—includes 2 bits.

9) A multi-cluster flag—includes 1 bit.

10) A modulation and coding scheme (MCS)—includes 5 bits per transport block.

11) A new data indicator—includes 1 bit per transport block.

12) Precoding information and the number of layers—the number of bits is determined as illustrated in Table 14 below.

Table 14 illustrates the number of bits for precoding information.

TABLE 14

| Number of antenna ports at UE | Number of bits for precoding information |
|---|---|
| 2 | 3 |
| 4 | 6 |

Table 15 illustrates contents of the precoding information field for two antenna ports.

TABLE 15

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1-7 | reserved |
| 2 | 1 layer: TPMI = 2 | | |
| . . . | . . . | | |
| 5 | 1 layer: TPMI = 5 | | |
| 6-7 | reserved | | |

Table 16 illustrates contents of the precoding information field for four antenna ports.

TABLE 16

| One codeword: Codeword 0 enabled Codeword 1 disabled | | Two codewords: Codeword 0 enabled Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| ... | ... | ... | ... |
| 23 | 1 layer: TPMI = 23 | 15 | 2 layers: TPMI = 15 |
| 24 | 2 layers: TPMI = 0 | 16 | 3 layers: TPMI = 0 |
| 25 | 2 layers: TPMI = 1 | 17 | 3 layers: TPMI = 1 |
| ... | ... | ... | ... |
| 39 | 2 layers: TPMI = 15 | 27 | 3 layers: TPMI = 11 |
| 40-63 | reserved | 28 | 4 layers: TPMI = 0 |
|  |  | 29-63 | Reserved |

If two transport blocks are all enabled, the transport block 1 is mapped into codeword 0, and the transport block 2 is mapped into codeword 1. If one transport block is disabled, mapping of the transport block into the codeword is as illustrated in Table 7 above.

If the number of information bits within the DCI format 4 belongs to the size set of Table 1 above, one 0 bit may be appended to the DCI format 4.

Figure 6:
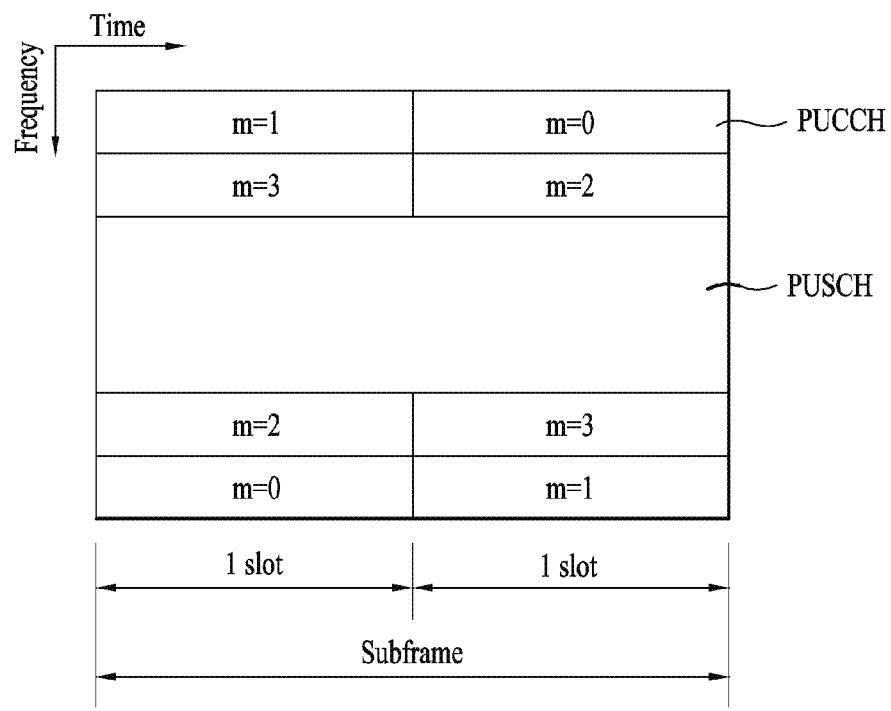
FIG. 6 illustrates the structure of a UL (UpLink) subframe in a LTE system.

FIG. 6 illustrates the structure of a UL subframe in a LTE system.

Referring to FIG. 6, the UL subframe can be divided into a region to which Physical Uplink Control Channels (PUCCHs) carrying control information are allocated, and a region to which Physical Uplink Shared Channels (PUSCHs) carrying user data are allocated. A middle part of the subframe is allocated for the PUSCHs, and two side parts of the data region in the frequency domain are allocated for the PUCCHs. The control information carried by the PUCCH includes ACK/NACK used for HARQ, a channel quality indicator (CQI) indicating DL channel state, a rank indicator (RI) for MIMO, a scheduling request (SR) which is a UL resource allocation request, etc. The PUCCH for one UE uses one resource block which occupies different frequencies in slots of the subframe. That is, 2 resource blocks allocated for the PUCCH are frequency hopped at a slot boundary. Specifically, FIG. 6 exemplarily shows that a PUCCH of m=0, a PUCCH of m=1, a PUCCH of m=2, and a PUCCH of m=3 are allocated to the subframe.

A description is now given of a MIMO system. Multiple-Input Multiple-Output (MIMO) is a method using multiple Tx antennas and multiple Rx antennas, and this method may improve transmission and reception efficiency of data. That is, a transmitter or receiver of a wireless communication system uses multiple antennas and thus the capacity and performance thereof may be improved. In the following description of the present invention, MIMO can be called 'multiple antenna technology'.

In the multiple antenna technology, reception of one whole message does not depend on a single antenna path. Instead, in the multiple antenna technology, data fragments received through multiple antennas are collected and combined to complete data. If the multiple antenna technology is used, a data transfer rate within a cell region of a specific size may be improved, or system coverage may be improved while ensuring a specific data transfer rate. In addition, this technology can be broadly used by mobile communication devices and relays. Due to the multiple antenna technology, restriction on mobile communication traffic based on a legacy technology using a single antenna can be solved.

Figure 7:
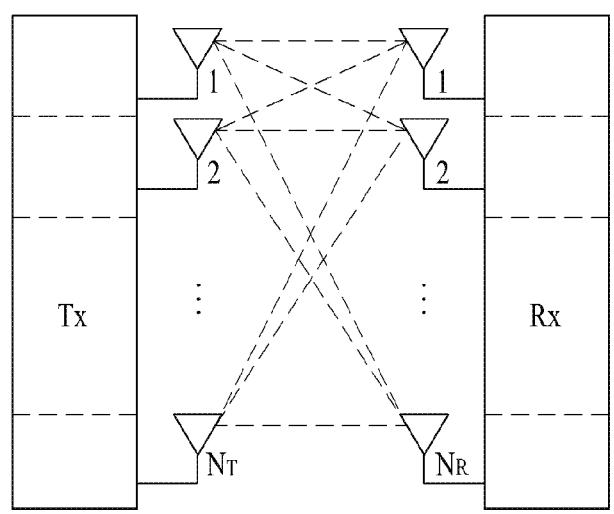
FIG. 7 is a structural diagram of a general Multiple-Input Multiple-Output (MIMO) communication system.

FIG. 7 shows the configuration of a wireless communication system including multiple antennas. When both the number of transmit (Tx) antennas and the number of Rx antennas respectively to $N_T$ and $N_R$, a theoretical channel transmission capacity of the MIMO communication system increases in proportion to the number of antennas, differently from the above-mentioned case in which only a transmitter or receiver uses several antennas, so that transmission rate and frequency efficiency can be greatly increased. In this case, the transfer rate acquired by the increasing channel transmission capacity can theoretically increase by a predetermined amount that corresponds to multiplication of a maximum transfer rate (Ro) acquired when one antenna is used and a rate of increase (Ri). The rate of increase (Ri) can be represented by the following equation 1. Herein, Ri is a smaller value between $N_T$ and $N_R$.

$$R_i = \min(N_T, N_R) \qquad \text{[Equation 1]}$$

For example, provided that a MIMO system uses four Tx antennas and four Rx antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase data transfer rate using the theoretical capacity increase. Some of the above technologies have been reflected in a variety of wireless communication standards, for example, third-generation mobile communication or next-generation wireless LAN, etc.

A variety of MIMO-associated technologies have been intensively researched by many companies or developers, for example, research into information theory associated with MIMO communication capacity under various channel environments or multiple access environments, research into a radio frequency (RF) channel measurement and modeling of the MIMO system, and research into a space-time signal processing technology.

Mathematical modeling of a communication method for use in the above-mentioned MIMO system will hereinafter be described in detail. As can be seen from FIG. 7, it is assumed that there are $N_T$ Tx antennas and $N_R$ Rx antennas. In the case of a transmission signal, a maximum number of transmission information pieces is $N_T$ under the condition that $N_T$ Tx antennas are used, so that the transmission information can be represented by a specific vector shown in the following equation 2.

$$s = [s_1, s_2, \ldots, s_{N_T}]^T \qquad \text{[Equation 2]}$$

In the meantime, individual transmission information pieces $s_1, s_2, \ldots, s_{N_T}$ may have different transmission powers. In this case, if the individual transmission powers are denoted by $P_1, P_2, \ldots, P_{N_T}$, transmission information having an adjusted transmission power can be represented by a specific vector shown in the following equation 3.

$$\hat{s} = [\hat{s}_1, \hat{s}_2, \ldots \hat{s}_{N_T}]^T = [P_1 s_1, P_2 s_2, \ldots, P_{N_T} s_{N_T}]^T \qquad \text{[Equation 3]}$$

In Equation 3, ŝ is a transmission vector, and can be represented by the following equation 4 using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

*78

In the meantime, the information vector $\hat{S}$ having an adjusted transmission power is applied to a weight matrix W, so that $N_T$ transmission signals $x_1, x_2, \ldots, x_{NT}$ to be actually transmitted are configured. In this case, the weight matrix W is adapted to properly distribute transmission information to individual antennas according to transmission channel situations. The above-mentioned transmission signals $x_1$, $x_2, \ldots, x_{NT}$ can be represented by the following equation 5 using the vector X. Here, $W_{ij}$ denotes a weight corresponding to i-th Tx antenna and j-th information. W represents a weight matrix or precoding matrix.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & 2_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = $$ [Equation 5]

$$W\hat{s} = WP$$

Generally, a matrix rank is defined by a smaller number between the number of rows and the number of columns, in which the rows and the columns are independent of each other. Therefore, the matrix rank cannot be higher than the number of rows or columns. The rank of the channel matrix H can be represented by the following equation 6.

$$\text{rank}(H) \leq \min(N_T, N_R)$$ [Equation 6]

In addition, each of different pieces of information transmitted using the multiple antenna technology is now defined as a 'transport stream' or simply a 'stream'. This 'stream' can be called a 'layer'. Then, the number of transport streams cannot be greater than a channel rank which is the maximum number of different pieces of information transmittable using the multiple antenna technology. Accordingly, a channel matrix H can be expressed as given by Equation 7.

$$\text{\# of streams} \leq \text{rank}(H) \leq \min(N_T, N_R)$$ [Equation 7]

Here, "# of streams" denotes the number of streams. Meanwhile, it should be noted here that one stream can be transmitted through one or more antennas.

There can be a variety of methods for mapping one or more streams to multiple antennas. These methods may be described as follows depending on the type of the multiple antenna technology. A case in which a single stream is transmitted through multiple antennas can be regarded as a spatial diversity scheme, and a case in which multiple streams are transmitted through multiple antennas can be regarded as a spatial multiplexing scheme. Alternatively, a hybrid of spatial diversity and spatial multiplexing can also be used.

Hereinafter, Channel State Information (CSI) reporting will be described below. In the current LTE standard, there are two MIMO transmission schemes, open-loop MIMO operating without channel information and closed-loop MIMO operating with channel information. Particularly, in the closed-loop MIMO, each of an eNB and a UE may perform beamforming based on the channel state information to acquire the multiplexing gain of MIMO antennas. To acquire the channel state information from the UE, the eNB may allocate a PUCCH (Physical Uplink Control Channel) or PUSCH (Physical Uplink Shared Channel) to the UE and may command the UE to feed back the channel state information on the PUCCH or PUSCH.

The CSI is largely categorized into three information types, RI (Rank Indicator), PMI (Precoding Matrix Index), and CQI (Channel Quality Indication). First of all, the RI is indicates rank information on a channel as described above, and means the number of streams that may be received by the UE through the same time-frequency resources. Also, since the RI is determined by long term fading of a channel, the RI may be fed back to the eNB at a longer period than the PMI and the CQI.

Secondly, the PMI indicates a precoding matrix index of an eNB preferred by the UE based on a metric such as a signal to interference and noise ratio (SINR), reflecting the spatial characteristics of channels. Finally, the CQI is a value indicating a channel strength. In general, the CQI means a reception SINR that can be obtained when the eNB uses the PMI.

In the more advanced communication system such as the LTE-A standard, multi-user diversity has been additionally obtained using multi-user MIMO (MU-MIMO). Since interference between UEs multiplexed in an antenna domain exists in the MU-MIMO, whether CSI is accurate may affect interference of the other multiplexed UEs as well as the UE that has reported the CSI. Accordingly, more exact CSI reporting is required in the MU-MIMO than the SU-MIMO.

In this respect, in the LTE-A standard, it has been determined that the design of the final PMI is divided into W1 which is a long term and/or wideband (WB) PMI and W2 which is a short term and/or sub-band (SB) PMI.

As an example of hierarchical codebook transformation that constitutes one final PMI from W1 and W2, a long term covariance matrix of a channel may be used as expressed by the following Equation 8.

$$W = \text{norm}(W1\,W2)$$ [Equation 8]

In the Equation 8, W2 is a short term PMI, and represents a codeword of a codebook configured to reflect short term channel state information, W represents a codeword of the final codebook, and norm(A) means a matrix in which norm for each column of a matrix A is normalized to 1.

A detailed structure of W1 and W2 is expressed by the following Equation 9.

$$W1(i) = \begin{bmatrix} X_i & 0 \\ 0 & X_i \end{bmatrix}, \text{ where } X_i \text{ is } Nt/2 \text{ by } M \text{ matrix.}$$ [Equation 9]

$$W2(j) = \overbrace{\begin{bmatrix} e_M^k & e_M^l & e_M^m \\ \alpha_j e_M^k & \beta_j e_M^l & \gamma_j e_M^m \end{bmatrix}}^{r \text{ columns}} \text{ (if rank = r), where } 1 \leq $$

$$k, l, m \leq M \text{ and } k, l, m \text{ are integer.}$$

In this case, Nt represents the number of transmitting antennas, and M is the number of columns of a matrix Xi and represents that a total of M number of candidate column vectors exist in the matrix Xi. eMk, eMl, and eMm are the kth, lth, and mth column vectors of the matrix Xi in which the kth, lth and mth elements of M number of elements are 1 and the other elements are all 0. αj, βj, and γj are complex values having unit norm, and represent that phase rotation is applied to the kth, lth and mth column vectors of the matrix Xi when the kth, lth and mth column vectors are sorted out. i is an integer more than 0 and represents PMI index indicating W1. j is an integer more than 0 and represents PMI index that indicates W2.

In the Equation 9, the structure of the codeword is designed by reflecting correlation properties of channels if intervals between cross polarized antennas are compact, for example, if the distance between neighboring antennas is less than half of signal wavelength. The cross polarized antennas may be divided into a horizontal antenna group and a vertical antenna group, wherein each of the horizontal antenna group and the vertical antenna group has uniform linear array (ULA) antenna properties, and these two antenna groups are co-located.

Accordingly, the correlation between the antennas of each group has the same linear phase increment properties, and the correlation between the antenna groups has phase rotation properties. Finally, since the codebook is the value obtained by quantization of the channel, the codebook needs to be designed by reflecting channel properties. For convenience of description, rank 1 codeword made by the aforementioned structure may be expressed by the following Equation 10.

$$W1(i) * W2(j) = \begin{bmatrix} X_i(k) \\ \alpha_j X_i(k) \end{bmatrix} \qquad \text{[Equation 10]}$$

In the above Equation 10, the codeword is expressed by vectors of the number of transmitting antennas $N_T \times 1$ vector, and is structuralized by a higher vector $X_i(k)$ and a lower vector $\alpha_j X_i(k)$, each of which has correlation properties of the horizontal antenna group and the vertical antenna group. $X_i(k)$ is preferably expressed by a vector having linear phase increment properties by reflecting the correlation properties between the antennas of each antenna group, and may use a DFT matrix.

As described above, in the LTE system, the channel state information (CSI) includes, but not limited to, CQI, PMI, and RI, and all or some of CQI, PMI and RI are transmitted in accordance with a transmission mode of each UE. Periodic transmission of the channel state information will be referred to as periodic reporting, and transmission of the channel state information based on a request of the base station will be referred to as aperiodic reporting. In case of aperiodic reporting, a request bit included in uplink scheduling information transmitted from the base station is transmitted to the user equipment. Afterwards, the UE transfers the channel state information considering its transmission mode to the base station through an uplink data channel (PUSCH). In case of periodic reporting, a period and offset at the corresponding period are signaled to each UE in a unit of subframe semi-statically through an upper layer signal. Each UE transfers the channel state information considering the transmission mode to the base station through an uplink control channel (PUCCH) in accordance with a predetermined period. If uplink data simultaneously exist at the subframe for transmitting the channel state information, the channel state information is transmitted together with data through the uplink data channel (PUSCH). The base station transmits transmission timing information suitable for each UE to the UE by considering a channel status of each UE and a distribution status of UEs within a cell. The transmission timing information includes a period for transmitting the channel state information, offset, etc., and may be transmitted to each UE through RRC message.

Additionally, a codebook for precoding and CSI (Channel State Information) reporting will be described.

For transmission from two antenna ports ($p \in \{0,1\}$, a precoding matrix W(i) may be selected from Table 17 below or a subset in Table 17. In case of the closed loop spatial multiplexing transmission mode, when the number of layers is $v=2$, a codebook index 0 is not used.

Table 17 illustrates a codebook for transmission at antenna ports $\{0, 1\}$.

TABLE 17

| Codebook | Number of layers $v$ | |
|---|---|---|
| index | 1 | 2 |
| 0 | $\frac{1}{\sqrt{2}}\begin{bmatrix}1\\1\end{bmatrix}$ | $\frac{1}{\sqrt{2}}\begin{bmatrix}1 & 0\\0 & 1\end{bmatrix}$ |
| 1 | $\frac{1}{\sqrt{2}}\begin{bmatrix}1\\-1\end{bmatrix}$ | $\frac{1}{2}\begin{bmatrix}1 & 1\\1 & -1\end{bmatrix}$ |
| 2 | $\frac{1}{\sqrt{2}}\begin{bmatrix}1\\j\end{bmatrix}$ | $\frac{1}{2}\begin{bmatrix}1 & 1\\j & -j\end{bmatrix}$ |
| 3 | $\frac{1}{\sqrt{2}}\begin{bmatrix}1\\-j\end{bmatrix}$ | — |

For transmission from four antenna ports ($p \in \{1,2,3\}$), the precoding matrix W(i) may be selected from Table 18 below or a subset in Table 18. $w_n^{\{s\}}$ represents a matrix defined by columns determined by a set $\{s\}$ in $W_n = I - 2u_n u_n^H / u_n^H u_n$. In this case, I represents an identity matrix of 4×4, and is determined by the following Table 18.

Table 18 illustrates a codebook for transmission at antenna ports $\{0, 1, 2, 3\}$.

TABLE 18

| Codebook index | $u_n$ | Number of layers $v$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |

TABLE 18-continued

| Codebook index | $u_n$ | Number of layers $\upsilon$ | | | |
|---|---|---|---|---|---|
| | | 1 | 2 | 3 | 4 |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Figure 8:
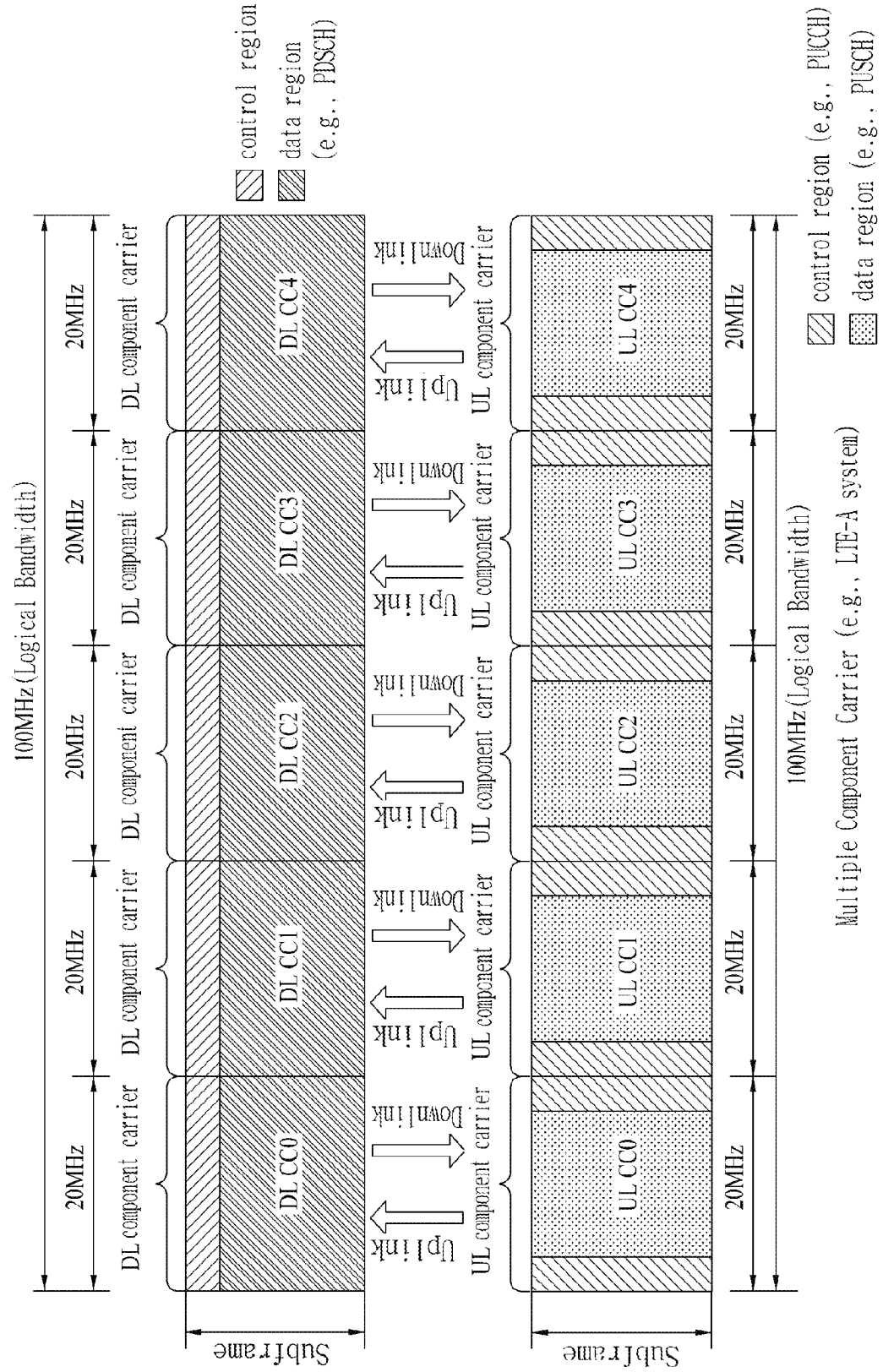
FIG. 8 is a diagram illustrating a carrier aggregation (CA) communication system.

FIG. 8 is a diagram illustrating a carrier aggregation (CA) communication system.

Referring to FIG. 8, a plurality of uplink/downlink component carriers (CC) may be collected to support wider uplink/downlink bandwidths. The respective CCs may adjoin each other or not in the frequency domain. A bandwidth of each component carrier may be defined independently. Asymmetric carrier aggregation where the number of UL CCs is different from the number of DL CCs may be performed. Meanwhile, the control information may be set to be transmitted and received through a specific CC only. This specific CC may be referred to as a primary CC (PCC), and the other CCs may be referred to as secondary CCs (SCCs). The PCC may be used such that the UE may perform an initial connection establishment procedure or connection re-establishment procedure. The PCC may refer to a cell indicated during a handover procedure. The SCC may be configured after RRC connection is established, and may be used to provide an additional radio resource. For example, if cross-carrier scheduling (or cross-CC scheduling) is used, the PDCCH for downlink allocation may be transmitted to DL CC#0, and the corresponding PDSCH may be transmitted to DL CC#2. The terminology "component carrier" may be replaced with another equivalent terminology (for example, carrier, cell, etc.).

For cross-carrier scheduling, a carrier indicator field (CIF) is used. Configuration of the presence or not of the CIF within the PDCCH may be enabled by upper layer signaling (for example, RRC signaling) semi-statically and UE-specifically (or UE group-specifically). The base line of PDCCH transmission may be summed up as follows:
- CIF disabled: the PDCCH on the DL CC allocates PDSCH resource on the same DL CC or PUSCH resource on one linked UL CC.
  - No CIF
- CIF enabled: the PDCCH on the DL CC may allocate PDSCH or PUSCH resource on one DL/UL CC of a plurality of aggregated DL/UL CCs by using the CIF.
  - LTE DCI format extended to have CIF
    - CIF (if configured) is a fixed x-bit field (for example, x=3)
    - CIF (if configured) location is fixed regardless of DCI format size.

If the CIF exists, the base station may allocate a PDCCH monitoring DL CC (set) to reduce complexity of blind detection (BD) in view of the UE. For PDSCH/PUSCH scheduling, the UE may detect and decode the PDCCH on the corresponding DL CC only. Also, the base station may transmit the PDCCH through monitoring DL CC (set) only. The monitoring DL CC set may be set UE-specifically, UE group-specifically or cell-specifically.

Figure 9:
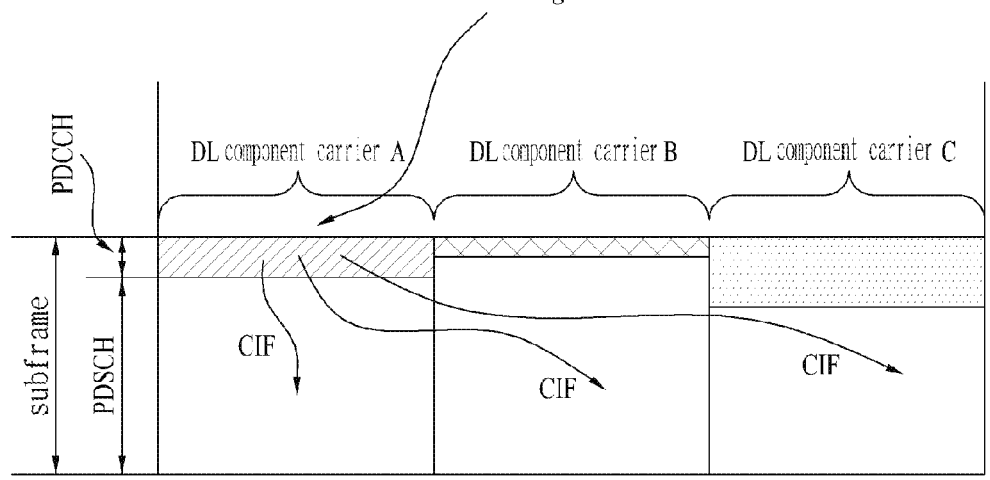
FIG. 9 illustrates that three DL CCs are aggregated and DL CC A is set to a monitoring DL CC.

FIG. 9 illustrates that three DL CCs are aggregated and DL CC A is set to a monitoring DL CC. If the CIF is disabled, each DL CC may transmit the PDCCH that schedules a PDSCH of each DL CC without CIF in accordance with the LTE PDCCH rule. On the other hand, if the CIF is enabled by upper layer signaling, only the DL CC A may transmit the PDCCH, which schedules the PDSCH of another CC as well as the PDSCH of the DL CC A, by using the CIF. The PDCCH is not transmitted from the DL CC B and DL CC C which are not set to the PDCCH monitoring DL CC.

Hereinafter, Cooperative Multipoint Transmission/Reception (CoMP) will be described.

The post-LTE-A system considers a system that enhances system throughput through cooperation between cells. This system will be referred to a Cooperative Multipoint Transmission/Reception (CoMP) system. The CoMP system means a communication system that two or more base stations, access points or cells perform communication with the UE in cooperative with one another to effectively perform communication between a specific UE and the base station, access point or cell. In the present invention, the base station, the access point, or the cell may be used to refer to the same thing.

Generally, in a multi-cell environment where a frequency reuse factor is 1, throughput of the UE located at the cell edge and average sector throughput may be reduced due to inter-cell interference (ICI). In order to reduce ICI, a method for enabling a UE located at the cell edge in an environment restricted by interference to have proper throughput by using a simple passive scheme such as fractional frequency reuse (FFR) through UE specific power control has been applied to the LTE system according to the related art. However, it may be more preferable to reduce ICI or allow the UE to reuse ICI as a desired signal than to reduce use of frequency resources per cell. To this end, a CoMP transmission scheme may be used.

Figure 10:
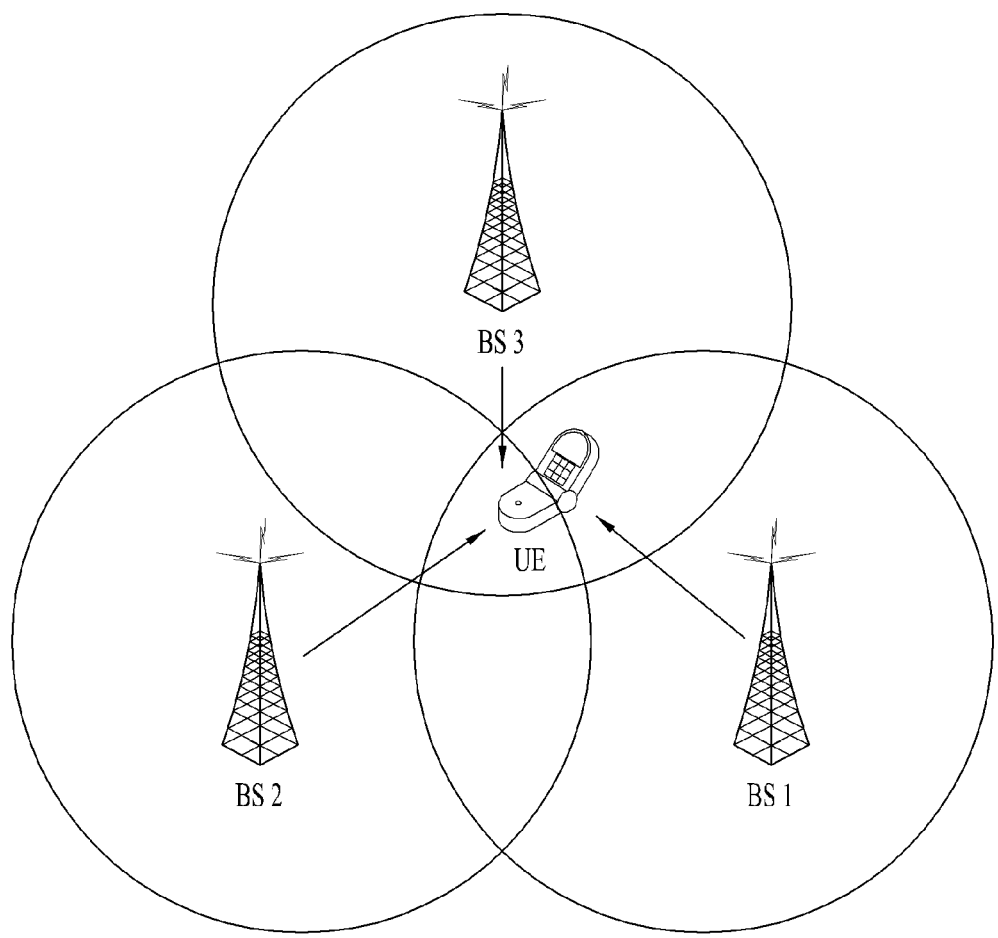
FIG. 10 is a diagram illustrating an example of CoMP which is performed.

FIG. 10 is a diagram illustrating an example of performing CoMP. Referring to FIG. 10, the wireless communication system includes a plurality of base stations BS1, BS2 and BS3, which perform CoMP, and a UE. The plurality of base stations BS1, BS2 and B3 that perform CoMP may efficiently transmit data to the UE in cooperative with one another.

Examples of the CoMP transmission scheme may include a coordinated MIMO type joint processing (CoMP-JP) scheme through data sharing and a CoMP-coordinated scheduling/beamforming (CoMP-CS/CB) scheme.

In case of a downlink, according to the joint processing (CoMP-JP) scheme, the UE may simultaneously receive data from each base station that performs the CoMP transmission scheme, and may improve receiving throughput by combining the signals received from each base station (joint transmission; JT). Also, there may be considered a method (dynamic point selection, DPS) for transmitting data from one of base stations, which perform the CoMP transmission scheme, to the UE at a specific time. Unlike this method, according to the coordinated scheduling/beamforming (CoMP-CS/CB) scheme, the UE may momentarily receive data from one base station, that is, serving base station, through beamforming.

In case of an uplink, according to the joint processing (CoMP-JP) scheme, the respective base stations may simultaneously receive a PUSCH signal from the UE (Joint Reception; JR). Unlike this, according to the coordinated scheduling/beamforming (CoMP-CS/CB) scheme, only one base station may receive a PUSCH. At this time, cooperative cells (or base stations) may determine to use the coordinated scheduling/beamforming scheme.

The UE, which uses the CoMP transmission scheme, that is, CoMP UE may feed channel information back (CSI feedback) to a plurality of base stations that perform the CoMP transmission scheme. A network scheduler may select a proper CoMP transmission scheme that may increase a transmission rate, from the CoMP-JP scheme, the CoMP-CS/CB scheme and the DPS scheme, on the basis of the CSI feedback. To this end, the CoMP UE may configure CSI feedback within a plurality of base stations, which perform the CoMP transmission scheme, in accordance with a periodic feedback transmission scheme based on an uplink PUCCH. In this case, feedback configuration for each base station may be independent. Accordingly, in this specification according to one embodiment of the present invention, feedback operation of channel information in accordance with independent feedback configuration will be referred to as CSI process. One or more CSI processes may exist in one serving cell.

Figure 11:
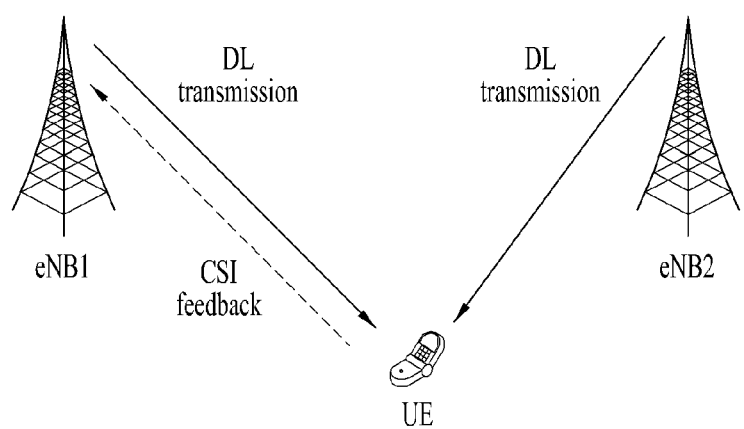
FIG. 11 illustrates that downlink CoMP operation is performed.

FIG. 11 is a diagram illustrating that downlink CoMP operation is performed.

In FIG. 11, the UE is located between eNB1 and eNB2, and two eNBs (that is, eNB1 and eNB2) perform a proper CoMP operation such as JT, DCS, and CS/CB to solve interference to the UE. The UE performs proper CSI feedback to assist CoMP operation of the base station. Information transmitted through CSI feedback includes PMI information and CQI information of each eNB, and may additionally include channel information (for example, phase offset information between two eNBs) between two eNBs for JT.

In FIG. 11, although the UE transmits a CSI feedback signal to the eNB1 which is its serving cell, the UE may transmit the CSI feedback signal to the eNB2 or two eNBs in accordance with the status. Also, although FIG. 11 illustrates eNB as a basic unit for joining CoMP, the present invention may be applied to CoMP between transmission points controlled by a single eNB.

In other words, for CoMP scheduling at the network, the UE should feed back downlink (DL) CSI information of a neighboring eNB/TP, which joins CoMP, as well as DL CSI information of a serving eNB/TP. To this end, the UE feeds back a plurality of CSI processes, which reflect various data transmission eNBs/TPs and various interference environments.

Hereinafter, based on the aforementioned description, a signaling method of a base station of a neighboring cell or a base station of a serving cell to improve received signal performance of a UE having interference cancellation capability will be described.

Generally, a wireless communication system is an interference-limited system based on inter-cell interference in the urban environment and reaches a system capacity limit. Also, if one base station transmits multi-layer signal of multiple beams by using a multiple transmission and reception antenna transmission scheme, that is, SU-MIMO or MU-MIMO transmission scheme, inter-layer interference within a cell is one of main factors that determine a limit of system capacity. Therefore, to reduce inter-cell interference and intra-cell interference, the need of standardization and development of a coordinated transmission and high-fidelity reception scheme has been increased.

A downlink coordinated transmission scheme is to allow a transmitter to configure transmission beams to minimize inter-cell interference and intra-cell interference on the basis of channel state information (CSI) reported from a receiver. In this case, although complexity of a UE is not increased within a great range during a data reception procedure, performance of the UE greatly depends on accuracy of channel state information reporting. Unlike the downlink coordinated transmission scheme, the high-fidelity reception scheme is to obtain better received performance at the receiver by using features of an interference signal. In this case, it is important how the UE acquires information on an interference signal transmitted together with a desired signal.

Major examples of the high-fidelity receiver include:
Linear MMSE IRC receiver;
Maximum likelihood detection receiver; and
Interference cancellation receiver, etc.

Better performance of the receiver, information of more interfering signals is required. For example, since an iterative decoding interference cancellation receiver known as a receiver having the best performance should regenerate an interference signal to allow a UE to decode and cancel the interference signal, information for decoding the interference signal is required.

Hereinafter, the present invention will be described based on the interference cancellation receiver of the aforementioned high-fidelity receivers, and a UE having the aforementioned high-fidelity receiver will be defined as an IC-UE.

First of all, a received signal received by the IC-UE may be expressed by the following Equation 11.

$$r = HPs + HP_c s_c + H_I P_I s_I + N \qquad \text{[Equation 11]}$$

In the Equation 11, H means a channel from the serving cell to the IC-UE, and $H_I$ means a channel from a neighboring cell to the IC-UE. Also, in the Equation 11, P, $P_c$, and $P_I$ mean precoding for the IC-UE, precoding for a UE scheduled within a cell together with the IC-UE, and precoding for a UE that receives data from a neighboring cell, respectively. In the Equation 11, $H_I P_I s_I$ means inter-cell interference, and in the present invention, a corresponding cell means the most dominant cell. Moreover, in the present invention, the dominant cell will briefly be expressed as a 'neighboring cell'. Therefore, N may be regarded as the equation that includes thermal noise of the IC-UE and interference from another cell which is not dominant.

Generally, in the Equation (3-1), HP and $HP_C$ may be identified through a reference signal, to which precoding is applied, such as a DM-RS. And, $H_I P_I$ may be identified using neighboring cell DM-RS information if a neighboring cell uses a transmission mode TM 7 or more (TM7, TM8, TM9, TM10, ... ). Alternatively, if the neighboring cell uses TM1 or TM2, or if the neighboring cell uses DCI 1A (of a random transmission mode), the IC-UE may identify $H_I$ by using a CRS (Cell-specific Reference Signal) of the neighboring cell, and since $P_I$ is an open loop system, the IC-UE does not need to identify $P_I$.

However, if the neighboring cell does not use DCI 1A while using TM3~TM6, the status is varied. First of all, it is assumed that the IC-UE may identify $H_I$ by using the CRS of the neighboring cell. However, if the IC-UE cannot identify DCI for a specific UE of the neighboring cell, it is difficult for the IC-UE to detect $P_I$.

Therefore, in the present invention, the neighboring cell or the serving cell may signal $P_I$ and RI information which is PMI of the neighboring cell and TM information to the IC-UE so as to assist that the IC-UE may cancel $H_I P_I S_I$ which is dominant interference. As a result, the IC-UE may cancel $H_I P_I S_I$ which is dominant interference (by decoding and regenerating the interference signal of the neighboring cell, for example). In this case, it is preferable that a PDCCH region is used if the serving cell performs signaling, and an EPDCCH region of the neighboring cell is used if the neighboring cell performs signaling.

Also, in the present invention, it is based on that $P_I$ and RI information and TM information are notified per subband. Also, this information may be configured to be used by all IC-UEs within the serving cell through broadcast transmission.

First Embodiment

As the first embodiment of the present invention, information on N number of subbands of the neighboring cell should be signaled for the IC-UE.

First of all, signaling of the information on N number of subbands of the neighboring cell may include at least one of the following signalings:

1-A) CRS-based subband information N bits;
1-B) TM information $2N_2$ bits used for each subband; and
1-C) Precoding information or Rank information $$\sum_{i=1}^{N_2} M_i$$

bits.

That is, in the signaling 1-A), the CRS-based subband information indicates which subband is a CRS-based subband. In the present invention, the CRS-based subband means a subband where one of TM3, TM4, TM5, and TM6 which do not use DCI 1A is used. Therefore, it may be assumed that one transmission mode of TM3, TM4, TM5, and TM6, which do not use DCI 1A, has been used in the CRS-based subband.

For example, if bit map information 2 bit for 2 subbands is transmitted as 2 bits '10', the IC-UE may recognize the first subband as the CRS-based subband and recognize the second subband as non-CRS-based subband. In this way, since the information on N number of subbands is transmitted through the signaling 1-A), N bits are transmitted. At this time, the number $N_2$ of CRS-based subbands is selected, wherein $N_2$ may be determined in accordance with the signaling 1-A).

Also, the signaling 1-B) may indicate which transmission mode is used in the CRS-based subband by the neighboring cell. In other words, the signaling 1-B) may indicate which mode of TM3, TM4, TM5, and TM6, which do not use DCI 1A, has been used, in a unit of 2 bits per subband. For example, if TM3=00, TM4=01, TM5=10, and TM6=11 are previously configured and bit map information on two (2) CRS-based subbands is signaled as '1001', the IC-UE may determine that the first subband uses TM5 and the second subband uses TM4.

Also, in the signaling 1-A), if a subband indicating '0' indicates a DMRS-based subband, instead of the signaling 1-B) and the signaling 1-C), information on an antenna port of a neighboring cell and ID used for a sequence of a DM-RS are transmitted to each subband, whereby the IC-UE may perform interference cancellation even for the DM-RS based subband.

Moreover, through the signaling 1-C), PMI and RI information in the CRS-based subband may be transmitted to each subband in a unit of $M_i$ bit.

If a specific subband is a CRS-based subband and TM3 which does not use DCI 1A is used, precoding information of '0' bit is transmitted when the number of antenna ports of the neighboring cell is 2, and precoding information of '2' bits is transmitted in a unit of $M_i$ bits when the number of antenna ports of the neighboring cell is 4. The description of the corresponding information is illustrated in Table 11. If the number of antenna ports is 4, information of 1 bit on the number of codewords illustrated in Table 11 will also be transmitted together with the precoding information.

If a specific subband is a CRS-based subband and TM4 which does not use DCI 1A is used, precoding information of '3' bits or '6' bits is transmitted in a unit of $M_i$ bits. The description of the corresponding information will be understood with reference to Table 5. The description of the corresponding information corresponding to the case where the number of antenna ports is 2 will be understood with reference to Table 8, and the description of the corresponding information corresponding to the case where the number of antenna ports is 4 will be understood with reference to Table 9.

If the number of antenna ports is 2, 8 indexes are expressed in Table 8 in accordance with codewords. TPM1 expressed in Table 8 is illustrated in Table 2, and TPMI expressed in Table 9 is illustrated in Table 17. In this case, 3 bit information may be configured by a total of 7 indexes using indexes '0' to '4' (that is, 0, 1, 2, 3, 4) when the number of codewords is 1 and indexes '0' and '1' when the number of codewords is 2. This is because that the other is not required.

Likewise, when the number of antenna ports is 4, 64 indexes are expressed in Table 9 in accordance with codewords. In this case, 6 bit information may be configured by a total of 64 indexes using indexes 1~16 and 18~33 when the number of codewords is 1 and indexes 17~32 and 34~49 when the number of codewords is 2. If 4 layers transmit diversity indicated by index '0' corresponding to the case where the number of codewords is 1 is used, the IC-UE is falsely notified that TM3 is used, and index '0' corresponding to the case where the number of codewords is 1 in Table 11 is transmitted.

If a specific subband is a CRS-based subband and TM5 which does not use DCI 1A is used, 1 bit information (1 user and selection of 2 users) on how many multi-users exist and precoding information (TPMI) of '2 $N_{UE}$' or '4 $N_{UE}$' bits on each UE are transmitted in a unit of $M_i$ bits. In this case, '$N_{UE}$' is the number of multi-users selected in a MU-MIMO mode of the neighboring cell. '2' or '4' bit information which is precoding information per UE of UEs scheduled in the MU-MIMO mode of the neighboring cell may be understood with reference to Table 2, the corresponding information may be understood with reference to Table 17 when the number of antenna ports is 2, and the corresponding information may be understood with reference to Table 18, which illustrates codewords that assume single layer transmission, when the number of antenna ports is 4.

If a specific subband is a CRS-based subband and TM6 which does not use DCI 1A is used, precoding information of '2' or '4' bits is transmitted in a unit of $M_i$ bits. The corresponding information may be understood with reference to Table 2. The corresponding information may be understood with reference to Table 17 when the number of antenna ports is 2, and may be understood with reference to Table 18, which illustrates codewords that assume single layer transmission, when the number of antenna ports is 4.

Alternatively, when a specific subband is a CRS-based subband and TM6 which does not use DCI 1A is used, the IC-UE is falsely notified that TM4 is used, and precoding information of '3' or '6' bits is transmitted in a unit of $M_i$ bits. The description of the corresponding information may be understood with reference to Table 5. Also, the corresponding information may be understood with reference to Table 8 when the number of antenna ports is 2, and may be understood with reference to Table 9 when the number of antenna ports is 4. If the number of antenna ports is 2, 8 indexes are expressed in Table 8 in accordance with codewords. TPM1 expressed in Table 8 is illustrated in Table 2, and TPMI expressed in Table 9 is illustrated in Table 17. In this case, 3 bit information may be configured by a total of 7 indexes using indexes 0 to 4 when the number of codewords is 1 and indexes 0 and 1 when the number of codewords is 2. This is because that the other is not required as described above. Also, when the number of antenna ports is 4, 64 indexes are expressed in Table 9 in accordance with codewords. Likewise even in this case, 6 bit information may be configured by a total of 64 indexes using indexes 1~16 and 18~33 when the number of codewords is 1 and indexes 17~32 and 34~49 when the number of codewords is 2.

In the aforementioned case, the CRS-based subband has been described based on TM3, TM4, TM5, and TM6 which do not use DCI 1A. Therefore, in the signaling 1-B), $2N_2$ bits are required in a unit of 2 bits per the number $N_2$ of CRS-based subbands.

However, in the present invention, to reduce signaling overhead, the CRS-based subband may be assumed as a subset of 4 transmission modes, which do not use DCI 1A, instead of the 4 transmission modes. In other words, the CRS-based subband may be scheduled to have α of the 4 transmission modes which do not use DCI 1A. For example, the CRS-based subband may be defined as TM4 and TM6, which do not use DCI 1A, and $N_2$ bits not $2N_2$ bits may only be signaled in the signaling 1-B). The value of a may previously be scheduled between the base station and the UE or may be notified semi-statically through upper layer signaling (for example, RRC signaling).

Also, in the signaling 1-C), if a specific subband is a CRS-based subband and TM5 which does not use DCI 1A is used, it means that a multi-user mode is used. At this time, the aforementioned description specifies that corresponding UEs are all signaled. However, in the present invention, in order to reduce signaling overhead, only information of one UE not maximum 2 UEs may be signaled. In this case, signaling of information of one UE may previously be scheduled between the base station and the UE, or the corresponding information may be signaled semi-statically through RRC signaling. The neighboring cell may configure information on TM as TM6 or TM4 not TM5 and then indicate an index of each configuration, which corresponds to a codeword of a single layer of Table 18.

Also, information of $N_2$, which may determine a size of the signaling 1-B), may be included in the signaling 1-A), and information of TM, which may determine a size of the signaling 1-C), may be included in the signaling 1-B). Therefore, the IC-UE may identify only the size of the signaling 1-A) through bandwidth information of the neighboring cell. In this case, in the first embodiment of the present invention, the signaling 1-A), the signaling 1-B) and the signaling 1-C) may be indicated using different DCIs. That is, the IC-UE may recognize the information of each of the signaling 1-A), the signaling 1-B) and the signaling 1-C) by receiving the signaling 1-C) after first receiving the signaling 1-A) and then receiving the signaling 1-B).

Alternatively, the signaling 1-A), the signaling 1-B) and the signaling 1-C) may be configured to be transmitted at the same time at maximum bits if possible, whereby the IC-UE may recognize the signalings at one time. In this case, the aforementioned value a may be used, or it is assumed that one UE is selected from the MU-MIMO mode, whereby maximum bits may be reduced.

Second Embodiment

As the second embodiment of the present invention, for the IC-UE, information on N number of subbands of the neighboring cell may be transmitted to include at least one of the following signalings:

2-A) CRS-based subband information N bits;

2-B) $N_2$ bits as to whether precoding information, rank, and TM information, which are used per subband have been changed;

2-C) TM information $2N_3$ bits used for each subband; and $$\sum_{i=1}^{N_3} M_i$$

2-D) Precoding information or Rank information bits.

Since the signaling 2-A) is the same as the description of the aforementioned signaling 1-A), its description will be replaced with the aforementioned description.

The signaling 2-B) indicates whether the CRS-based subbands N2 selected through the signaling 2-A) have been changed as compared with previous signaling. Therefore, '1' may be transmitted if one of the precoding information, the rank, and the TM information is changed, and '0' may be transmitted if not so. At this time, the number $N_3$ of CRS-based subbands of which information has been changed is selected, wherein $N_3$ may be determined in accordance with the signaling 2-B).

In the signaling 2-A), if a subband indicating '0' indicates a DMRS-based subband, instead of the signaling 2-B), the signaling 2-C) and the signaling 2-D), information on an antenna port of a neighboring cell and ID used for a sequence of a DM-RS are transmitted to each subband, whereby the IC-UE may perform interference cancellation even for the DM-RS based subband.

Moreover, the signaling 2-C) indicates which transmission mode is used in the CRS-based subband by the neighboring cell. In other words, the signaling 2-C) may indicate which mode of TM3, TM4, TM5, and TM6, which do not use DCI 1A, has been used, in a unit of 2 bits per subband. For example, if TM3=00, TM4=01, TM5=10, and TM6=11 are previously configured and bit map information on two (2) CRS-based subbands is signaled as '1001', the IC-UE may recognize that the first subband uses TM5 and the second subband uses TM4.

Moreover, in the signaling 2-D), PMI and RI information in the CRS-based subband may be transmitted to each subband in a unit of $M_i$ bits.

If a specific subband is a CRS-based subband and TM3 which does not use DCI 1A is used, precoding information of '0' bit is transmitted when the number of antenna ports of the neighboring cell is 2, and precoding information of '2' bits is transmitted in a unit of $M_i$ bits when the number of antenna ports of the neighboring cell is 4. The description of the corresponding information is illustrated in Table 11. If the number of antenna ports is 4, information of 1 bit on the number of codewords illustrated in Table 11 will also be transmitted together with the precoding information.

If a specific subband is a CRS-based subband and TM4 which does not use DCI 1A is used, precoding information of '3' bits or '6' bits is transmitted in a unit of $M_i$ bits. The description of the corresponding information may be understood with reference to Table 5. The description of the corresponding information may be understood with reference to Table 8 when the number of antenna ports is 2, and may be understood with reference to Table 9 when the number of antenna ports is 4.

If the number of antenna ports is 2, 8 indexes are expressed in Table 8 in accordance with codewords. TPM1 expressed in Table 8 is illustrated in Table 2, and TPMI expressed in Table 9 is illustrated in Table 17. In this case, 3 bit information may be configured by a total of 7 indexes using indexes '0' to '4' (that is, 0, 1, 2, 3, 4) when the number of codewords is 1 and indexes '0' and '1' when the number of codewords is 2. This is because that the other is not required.

Likewise, when the number of antenna ports is 4, 64 indexes are expressed in Table 9 in accordance with codewords. In this case, 6 bit information may be configured by a total of 64 indexes using indexes 1~16 and 18~33 when the number of codewords is 1 and indexes 17~32 and 34~49 when the number of codewords is 2. If 4 layers transmit diversity indicated by index '0' corresponding to the case where the number of codewords is 1 is used, the IC-UE is falsely notified that TM3 is used, and index '0' corresponding to the case where the number of codewords is 1 in Table 11 is transmitted.

If a specific subband is a CRS-based subband and TM5 which does not use DCI 1A is used, 1 bit information (1 user and selection of 2 users) on how many multi-users exist and precoding information (TPMI) of '2 $N_{UE}$' or '4 $N_{UE}$' bits on each UE are transmitted in a unit of $M_i$ bits. In this case, '$N_{UE}$' is the number of multi-users selected in a MU-MIMO mode of the neighboring cell. '2' or '4' bit information which is precoding information per UE of UEs scheduled in the MU-MIMO mode of the neighboring cell may be understood with reference to Table 2, the corresponding information may be understood with reference to Table 17 when the number of antenna ports is 2, and the corresponding information may be understood with reference to Table 18, which illustrates codewords that assume single layer transmission, when the number of antenna ports is 4.

If a specific subband is a CRS-based subband and TM6 which does not use DCI 1A is used, precoding information of '2' or '4' bits is transmitted in a unit of M, bits. The corresponding information may be understood with reference to Table 2. The corresponding information may be understood with reference to Table 17 when the number of antenna ports is 2, and may be understood with reference to Table 18, which illustrates codewords that assume single layer transmission, when the number of antenna ports is 4.

Alternatively, when a specific subband is a CRS-based subband and TM6 which does not use DCI 1A is used, the IC-UE is falsely notified that TM4 is used, and precoding information of '3' or '6' bits is transmitted in a unit of $M_i$ bits. The description of the corresponding information may be understood with reference to Table 5. Also, the corresponding information may be understood with reference to Table 8 when the number of antenna ports is 2, and may be understood with reference to Table 9 when the number of antenna ports is 4. If the number of antenna ports is 2, 8 indexes are expressed in Table 8 in accordance with codewords. TPM1 expressed in Table 8 is illustrated in Table 2, and TPMI expressed in Table 9 is illustrated in Table 17. In this case, 3 bit information may be configured by a total of 7 indexes using indexes 0 to 4 when the number of codewords is 1 and indexes 0 and 1 when the number of codewords is 2. This is because that the other is not required as described above. Also, when the number of antenna ports is 4, 64 indexes are expressed in Table 9 in accordance with codewords. Likewise even in this case, 6 bit information may be configured by a total of 64 indexes using indexes 1~16 and 18~33 when the number of codewords is 1 and indexes 17~32 and 34~49 when the number of codewords is 2.

In the aforementioned case, the CRS-based subband has been described based on TM3, TM4, TM5, and TM6 which do not use DCI 1A. Therefore, in the signaling 2-C), $2N_3$ bits are required in a unit of 2 bits per the number $N_3$ of CRS-based subbands.

However, in the first embodiment of the present invention, to reduce signaling overhead, the CRS-based subband may be assumed as a subset of 4 transmission modes, which do not use DCI 1A, instead of the 4 transmission modes. In other words, the CRS-based subband may be scheduled to have α of the 4 transmission modes which do not use DCI 1A. For example, the CRS-based subband may be defined as TM4 and TM6, which do not use DCI 1A, and $N_3$ bits not $2N_3$ bits may only be signaled in the signaling 2-C). The value of α may previously be configured between the base station and the UE or may be notified semi-statically through upper layer signaling (for example, RRC signaling).

Also, in the signaling 2-D), if a specific subband is a CRS-based subband and TM5 which does not use DCI 1A is used, it means that a multi-user mode is used. At this time, the aforementioned description specifies that corresponding UEs are all signaled. However, in the second embodiment of the present invention, in order to reduce signaling overhead, only information of one UE not maximum 2 UEs may be signaled. In this case, signaling of information of one UE may previously be configured between the base station and the UE, or the corresponding information may be signaled semi-statically through RRC signaling. The neighboring cell may configure information on TM as TM6 or TM4 not TM5 and then indicate an index of each configuration, which corresponds to a codeword of a single layer of Table 18.

Also, information of $N_2$, which may determine a size of the signaling 2-B), may be included in the signaling 2-A), information of $N_3$, which may determine a size of the signaling 2-C), may be included in the signaling 2-B), and information of TM, which may determine a size of the signaling 2-D), may be included in the signaling 2-C). Therefore, the IC-UE may identify only the size of the signaling 2-A) through bandwidth information of the neighboring cell. In this case, the signaling 2-A), the signaling 2-B), the signaling 2-C) and the signaling 2-D) may be indicated using different DCIs. That is, the IC-UE may recognize the information of each of the signaling 2-A), the signaling 2-B), the signaling 2-C) and the signaling 2-D) by finally receiving the signaling 2-D) after first receiving the signaling 2-A) and then receiving the signaling 2-B) and the signaling 2-C).

Alternatively, the signaling 2-A), the signaling 2-B), the signaling 2-C) and the signaling 2-D) may be configured to be transmitted at the same time at maximum bits if possible, whereby the IC-UE may recognize the signalings at one time. In this case, the aforementioned value a may be used, or it is assumed that one UE is selected from the MU-MIMO mode, whereby maximum bits may be reduced.

Third Embodiment

As the third embodiment of the present invention, for the IC-UE, information on N number of subbands of the neighboring cell may be transmitted to include at least one of the following signalings:

3-A) CRS-based subband information 2N bits; and
3-B) Precoding information or Rank information $$\sum_{i=1}^{N_2} M_i$$

bits.

Since the signaling 3-A) is configured in a unit of 2 bits per subband, and may be indicated as follows.

'00': non-CRS-based subband
'01': CRS-based subband, and TM 'X' is used.
'10': CRS-based subband, and TM 'Y' is used.
'11': CRS-based subband, and previous information is used as it is.

That is, in the signaling 3-A), if '00' is signaled, it indicates that '00' is not the CRS-based subband in the same manner as '0' in the signaling 1-A) or the signaling 2-A). If '01' or '10' is signaled, it means that '01' or '10' is the CRS-based subband, and '01' or '10' means TM 'X' or TM 'Y'. X and Y may have one value of 3, 4, 5, and 6, wherein the one value may be determined previously between transmission and reception or may be varied semi-statically through RRC signaling. If '11' is signaled, it means that '11' is the CRS-based subband and is the same as TM, precoding, and RI information, which are previously signaled. At this time, the value of $N_2$ is the value obtained by adding the number of subbands, which corresponds to '01' and '10', in the signaling 3-A).

In the signaling 3-A), if a subband indicating '00' indicates a DMRS-based subband, instead of the signaling 3-B), information on an antenna port of a neighboring cell and ID used for a sequence of a DM-RS are transmitted to each subband, whereby the IC-UE may perform interference cancellation even for the DM-RS based subband. That is, the signaling 3-B) may include the same description as that of the aforementioned signaling 1-C), and its description will be replaced with the aforementioned description.

Also, in the signaling 3-B), if a specific subband is a CRS-based subband and TM5 which does not use DCI 1A is used, it means that a multi-user mode is used. At this time, the aforementioned description specifies that corresponding UEs are all signaled. However, in the third embodiment of the present invention, in order to reduce signaling overhead, only information of one UE not maximum 2 UEs may be signaled. In this case, signaling of information of one UE may previously be configured between the base station and the UE, or the corresponding information may be signaled semi-statically through RRC signaling. The neighboring cell may configure information on TM as TM6 or TM4 not TM5 and then indicate an index of each configuration, which corresponds to a codeword of a single layer of Table 18.

Also, information of $N_2$, which may determine a size of the signaling 3-B), may be included in the signaling 3-A). Therefore, the IC-UE may identify only the size of the signaling 3-A) through bandwidth information of the neighboring cell. In this case, in the third embodiment of the present invention, the signaling 3-A) and the signaling 3-B) may be indicated using different DCIs. That is, the IC-UE may recognize the information of each of the signaling 3-A) and the signaling 3-B) by receiving the signaling 3-B) after receiving the signaling 3-A).

Alternatively, the signaling 3-A) and the signaling 3-B) may be configured to be transmitted at the same time at maximum bits if possible, whereby the IC-UE may recognize the signalings at one time. In this case, it is assumed that one UE is selected from the MU-MIMO mode, whereby maximum bits may be reduced.

Fourth Embodiment

The fourth embodiment of the present invention will be described. The neighboring cell transmits TM information in the first to third embodiments, whereas the neighboring cell may transmit PMI and RI information only to each subband without transmitting TM information in the fourth embodiment. This is because that precoding information corresponding to a case where TM6 which uses DCI 1B is used is included in precoding information corresponding to a case where TM4 which uses DCI 2 is used. Therefore, overlapped RI and precoding sets may be collected, whereby PMI and RI information may be notified to the IC-UE without TM information.

First of all, possible RI and PMI sets will be described for the fourth embodiment.

In case of a single user, if the number of antenna ports of the neighboring cell is 2, eight RI and PMI sets may be defined by combination of a case where an index of 'one codeword' of Table 8, which uses 2 layer transmit diversity, is '0' (a total of 1 index), a case where indexes of '1 layer' of Table 17 are '0' to '3' (a total of 4 indexes) and a case where indexes of '2 layers' of Table 17 are '0' to '2' (a total of 3 indexes), whereby all of available PMI and RI may be defined. At this time, eight RI and PMI sets indicate all of PMI and RI sets available in TM3, TM4 and TM6, and these sets may be defined as $\Phi_{2a}$.

Alternatively, if the number of antenna ports is 2, and if a single user and multi-users (TM5) are simultaneously considered, eleven RI and PMI sets may be defined by combination of a case where an index of 'one codeword' of Table 8, which uses 2 layer transmit diversity, is '0' (a total of 1 index), a case where indexes of '1 layer' of Table 17 are '0' to '3' (a total of 4 indexes) and a case where indexes '0' to '3' of '1 layer' of Table 17 are allocated to two users (a total of 6 indexes), whereby all of available PMI and RI may be defined. At this time, the eleven RI and PMI sets indicate all of PMI and RI sets available in TM3, TM4, TM5 and TM6, and these sets may be defined as $\Phi_{2b}$.

In case of a single user, if the number of antenna ports of the neighboring cell is 4, 68 RI and PMI sets may be defined by combination of a case where an index of 'one codeword' of Table 8, which uses 4 layer transmit diversity, is '0' (a total of 1 index), a case where indexes of 'two codewords' of Table 11, which uses 'large delay CDD precoding', are '0' to '2' (a total of 3 indexes) and a case where indexes of all layers of Table 18 are '0' to '15' (a total of 64 indexes), whereby all of available PMI and RI may be defined. At this time, 68 RI and PMI sets indicate all of PMI and RI sets available in TM3, TM4 and TM6, and these sets may be defined as $\Phi_{4a}$.

If the number of antenna ports is 4, and if a single user and multi-users (TM5) are simultaneously considered, 172 RI and PMI sets may be defined by combination of a case where an index of 'one codeword' of Table 11, which uses 4 layer transmit diversity, is '0' (a total of 1 index), a case where indexes of 'two codewords' of Table 11, which uses 'large delay CDD precoding' are '0' to '2' (a total of 3 indexes), a case where indexes of '1 layer', '2 layers' and '4 layers' of Table 18 are 0 to 15 (a total of 48 indexes) and a case where indexes '0' to '15' of '1 layer' of Table 18 are allocated to two users (a total of 120 indexes), whereby all of available PMI and RI may be defined. All of PMI and RI sets available in TM3, TM4, TM5 and TM6 are defined by the 172 RI and PMI sets, and these sets may be defined as $\Phi_{4b}$.

Based on the aforementioned description, according to the fourth embodiment of the present invention, information on N number of subbands of the neighboring cell may be transmitted for the IC-UE as follows:

4-A) Precoding information or Rank information NM bits.

In the signaling 4-A), M bits comprised of one of $\Phi_{2a}$, $\Phi_{2b}$, $\Phi_{4a}$, and $\Phi_{4b}$ and one kind of state information are signaled to each subband. In this case, one kind of state information indicates whether a subframe for a current subband is a CRS-based subband. This state information will be referred to as '4-A state information' for convenience of description in the present invention. Moreover, in the signaling 4-A), a set comprised of some of RI and PMI sets defined by one of $\Phi_{2a}$, $\Phi_{2b}$, $\Phi_{4a}$, and $\Phi_{4b}$ may be used.

In the signaling 4-A), if the subband indicating '4-A state information' indicates a DMRS-based subband, instead of the signaling 3-B), information on an antenna port of a neighboring cell and ID used for a sequence of a DM-RS are transmitted to each subband, whereby the IC-UE may perform interference cancellation even for the DM-RS based subband.

Fifth Embodiment

In the fifth embodiment of the present invention, at least one of the following signalings may be added to the signalings according to the first to fourth embodiments of the present invention.

5-E) 1 bit as to whether all of CRS-based subbands are used in the same TM.

That is, the signaling 5-E) additionally transmitted to the signalings described in the first to fourth embodiments is to reduce signaling overhead if the neighboring cell uses all of CRS-based subbands in the same TM.

Therefore, if it is signaled that all of CRS-based subbands are used in the same TM, the corresponding signaling may be transmitted together with the following signalings. If not so, the corresponding signaling may be transmitted together with all or some of the signalings according to the aforementioned embodiments. That is, if it is not signaled that all of CRS-based subbands are used in the same TM, for example, the corresponding signaling may be transmitted together with all or some of the signalings 1-A), 1-B) and 1-C) in the first embodiment, all or some of the signalings 2-A), 2-B), 2-C) and 2-D) in the second embodiment, all or some of the signalings 3-A) and 3-B) in the third embodiment, and the signaling 4-A) in the fourth embodiment.

5-A) CRS-based subband information N bits
5-B) TM information 2 bits used for all subbands
5-C) Precoding information or Rank information $$\sum_{i=1}^{N_2} M_i$$

bits.

The signaling 5-A) is the same as the aforementioned signaling A) (of the first embodiment). The signaling 5-B) indicates which transmission mode of TM 3, TM 4, TM 5 and TM 6, which do not use DCI 1A, is used in the CRS-based subband of the neighboring cell. Moreover, in order to reduce signaling overhead, the CRS-based subband may be assumed as a subset of 4 transmission modes, which do not use DCI 1A, instead of the 4 transmission modes. In other words, the CRS-based subband may previously be configured as α of the 4 transmission modes which do not use DCI 1A. For example, the CRS-based subband may be defined as TM4 and TM6, which do not use DCI 1A, and 1 bit not 2 bits may only be signaled in the signaling 5-B). The value of α may previously be configured between the base station and the UE or may be transmitted semi-statically through RRC signaling.

Moreover, through the signaling 5-C), PMI and RI information in each CRS-based subband is transmitted to each subband in a unit of $M_i$ bits.

If a specific subband is a CRS-based subband and TM3 which does not use DCI 1A is used, precoding information of '0' bit is transmitted when the number of antenna ports of the neighboring cell is 2, and precoding information of '2' bits is transmitted in a unit of $M_i$ bits when the number of antenna ports of the neighboring cell is 4. The description of the corresponding information is illustrated in Table 10 above, and is also illustrated in Table 11 when the number of antenna ports is 4. If the number of antenna ports is 4, information of 1 bit on the number of codewords illustrated in Table 11 will also be transmitted together with the precoding information.

If a specific subband is a CRS-based subband and TM4 which does not use DCI 1A is used, precoding information of '3' bits or '6' bits is transmitted in a unit of $M_i$ bits. The description of the corresponding information may be understood with reference to Table 5. The description of the corresponding information may be understood with reference to Table 8 when the number of antenna ports is 2, and may be understood with reference to Table 9 when the number of antenna ports is 4.

If the number of antenna ports is 2, 8 indexes are expressed in Table 8 in accordance with codewords. TPM1 expressed in Table 8 is illustrated in Table 2, and TPMI expressed in Table 9 is illustrated in Table 17. In this case, 3 bit information may be configured by a total of 7 indexes using indexes '0' to '4' (that is, 0, 1, 2, 3, 4) when the number of codewords is 1 and indexes '0' and '1' when the number of codewords is 2. This is because that the other is not required.

Likewise, when the number of antenna ports is 4, 64 indexes are expressed in Table 9 in accordance with codewords. In this case, 6 bit information may be configured by a total of 64 indexes using indexes 1~16 and 18~33 when the number of codewords is 1 and indexes 17~32 and 34~49 when the number of codewords is 2. If 4 layers transmit diversity indicated by index '0' corresponding to the case where the number of codewords is 1 is used, the IC-UE is falsely notified that TM3 is used, and index '0' corresponding to the case where the number of codewords is 1 in Table 11 is transmitted.

If a specific subband is a CRS-based subband and TM5 which does not use DCI 1A is used, 1 bit information (1 user and selection of 2 users) on how many multi-users exist and precoding information (TPMI) of '2 $N_{UE}$' or '4 $N_{UE}$' bits on each UE are transmitted in a unit of $M_i$ bits. In this case, '$N_{UE}$' is the number of multi-users selected in a MU-MIMO mode of the neighboring cell. '2' or '4' bit information which is precoding information per UE of UEs scheduled in the MU-MIMO mode of the neighboring cell may be understood with reference to Table 2, the corresponding information may be understood with reference to Table 17 when the number of antenna ports is 2, and the corresponding information may be understood with reference to Table 18, which illustrates codewords that assume single layer transmission, when the number of antenna ports is 4.

If a specific subband is a CRS-based subband and TM6 which does not use DCI 1A is used, precoding information of '2' or '4' bits is transmitted in a unit of $M_i$ bits. The corresponding information may be understood with reference to Table 2. The corresponding information may be understood with reference to Table 17 when the number of antenna ports is 2, and may be understood with reference to Table 18, which illustrates codewords that assume single layer transmission, when the number of antenna ports is 4.

Alternatively, when a specific subband is a CRS-based subband and TM6 which does not use DCI 1A is used, the IC-UE is falsely notified that TM4 is used, and precoding information of '3' or '6' bits is transmitted in a unit of $M_i$ bits. The description of the corresponding information may be understood with reference to Table 5. Also, the corresponding information may be understood with reference to Table 8 when the number of antenna ports is 2, and may be understood with reference to Table 9 when the number of antenna ports is 4. If the number of antenna ports is 2, 8 indexes are expressed in Table 8 in accordance with codewords. TPM1 expressed in Table 8 is illustrated in Table 2, and TPMI expressed in Table 9 is illustrated in Table 17. In this case, 3 bit information may be configured by a total of 7 indexes using indexes 0 to 4 when the number of codewords is 1 and indexes 0 and 1 when the number of codewords is 2. This is because that the other is not required as described above. Also, when the number of antenna ports is 4, 64 indexes are expressed in Table 9 in accordance with codewords. Likewise even in this case, 6 bit information may be configured by a total of 64 indexes using indexes 1~16 and 18~33 when the number of codewords is 1 and indexes 17~32 and 34~49 when the number of codewords is 2.

Also, in the signaling 5-C), if a specific subband is a CRS-based subband and TM5 which does not use DCI 1A is used, it means that a multi-user mode is used. At this time, the aforementioned description specifies that corresponding UEs are all signaled. However, in the fifth embodiment of the present invention, in order to reduce signaling overhead, only information of one user not maximum 2 users may be signaled. In this case, signaling of information of one user may previously be configured between the base station and the UE, or the corresponding information may be signaled semi-statically through RRC signaling. The neighboring cell may configure information on TM as TM6 or TM4 not TM5 and then indicate an index of each configuration, which corresponds to a codeword of a single layer of Table 18.

Also, information of $N_2$, which may determine a size of the signaling 5-C), may be included in the signaling 5-A). Therefore, the IC-UE may identify only the size of the signaling 5-A) through bandwidth information of the neighboring cell. In this case, the signaling 5-A) and the signaling 5-B) may be transmitted using the same DCI, and the signaling 5-C) may be transmitted using different DCIs. Also, the IC-UE may recognize the information of each of the signalings by receiving the signaling 5-C) after receiving the signalings 5-A) and 5-B).

Alternatively, the signaling 5-A), the signaling 5-B) and the signaling 5-C) may be configured to be transmitted at the same time at maximum bits if possible, whereby the IC-UE may recognize the signalings at one time. In this case, the aforementioned value a may be used, or it is assumed that one UE is selected from the MU-MIMO mode, whereby maximum bits may be reduced.

Moreover, a subframe for which information signaled in accordance with the fifth embodiment of the present invention is valid may be configured previously by the base station and the UE, or may be indicated previously by upper layer signaling.

Sixth Embodiment

In the sixth embodiment of the present invention, the following signaling may be added to the signalings according to the first to fifth embodiments of the present invention.

6-F) Signaling 'Z' bits indicating how many subframes are used to maintain CRS-based subframe information and precoding information, RI, and TM information of the CRS-based subframe as the same value on a time axis.

The signaling 6-F) may mean how many subframes are used when the neighboring cell uses TM, precoding information and RI information as the same value for all CRS-based subframes. For example, in case of Z=2, it means that '00' is valid for a current subframe only, '01' is valid until next frame, '10' is valid for the current subframe and next two subframes, and '11' is valid for the current subframe and next three subframes.

Moreover, the signaling 6-F) may additionally be used for the signalings according to the aforementioned embodiments of the present invention. For example, the corresponding signaling 6-F) may be transmitted together with all or some of the signalings 1-A), 1-B) and 1-C) in the first embodiment, all or some of the signalings 2-A), 2-B), 2-C) and 2-D) in the second embodiment, all or some of the signalings 3-A) and 3-B) in the third embodiment, the signaling 4-A) in the fourth embodiment, and the signaling 5-E) in the fifth embodiment. That is, although all of the signalings described in the present invention may be used, some of them may be used.

Moreover, in the first to sixth embodiments of the present invention, subbands are specified in a basic unit of signaling, but the unit of signaling should not be limited to the subbands. For example, PMI may be varied depending on a resource block unit or a slot unit. Therefore, the present invention does not exclude that information of a subband unit may be used in a resource block unit or a slot unit at one subframe. Moreover, information of a basic unit signaled in accordance with the present invention may be determined previously between transmission and reception, or may be indicated semi-statically through RRC signaling.

Alternatively, even though a basic unit is specified as a subband, if PMI is varied depending on a resource block (RB) or a slot within the subband, it is difficult to define PMI. Therefore, state information, which indicates that it is difficult to define and transmit PMI, or additional bit may be transmitted to the subband, whereby the subband may be configured so as not to consider PMI even though the subband is a CRS-based subband.

Alternatively, in the signalings (that is, the signalings 1-A), 2-A) and 3-A)) indicating that each subband is a CRS-based subband in the present invention, 1 bit may further be added, whereby four states may be configured previously and signaled, wherein the four states include the state indicating that it is difficult to define PMI in spite of the CRS-based subband, the state indicating the CRS-based subband and PMI, the DM-RS based subband state, no data state that data are not transmitted. In the fourth embodiment, '4-A state information' through the signaling 4-A) may be increased to 3 states, whereby the state indicating that it is difficult to define PMI in spite of the CRS-based subband, the DM-RS based subband state, no data state that data are not transmitted may be used. At this time, the DM-RS based subband state may be divided into several states to indicate ID used for a DM-RS sequence and the number of antenna ports.

Figure 12:
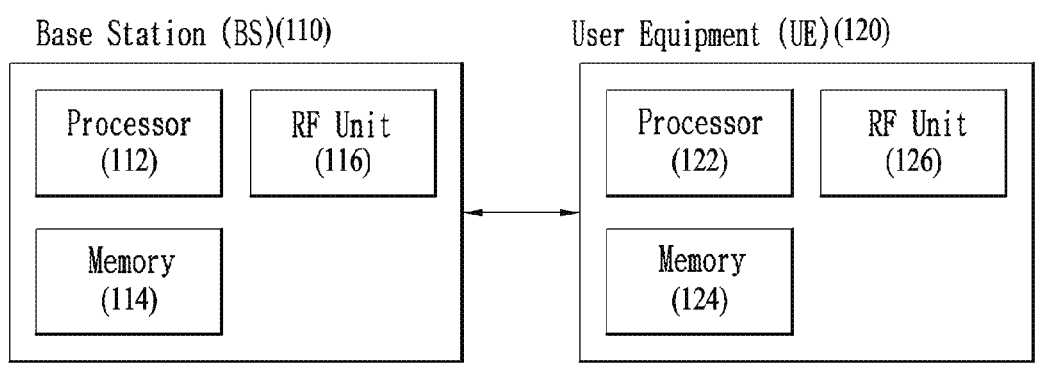
FIG. 12 illustrates a base station and a UE that may be applied to one embodiment of the present invention.

FIG. 12 is a diagram illustrating a base station and a user equipment, which may be applied to one embodiment of the present invention.

If a relay is included in a wireless communication system, communication in a backhaul link is performed between the base station and the relay and communication in an access link is performed between the relay and the user equipment. Accordingly, the base station or the user equipment as shown may be replaced with the relay depending on the circumstances.

Referring to FIG. 12, the wireless communication system includes a base station (BS) 110 and a user equipment (UE) 120. The base station 110 includes a processor 112, a memory 114, and a radio frequency (RF) unit 116. The processor 112 may be configured to implement procedures and/or methods suggested in the present invention. The memory 114 is connected with the processor 112 and stores various kinds of information related to the operation of the processor 112. The RF unit 116 is connected with the processor 112 and transmits and/or receives a radio signal. The user equipment 120 includes a processor 122, a memory 124, and a radio frequency (RF) unit 126. The processor 122 may be configured to implement procedures and/or methods suggested in the present invention. The memory 124 is connected with the processor 122 and stores various kinds of information related to the operation of the processor 122. The RF unit 126 is connected with the processor 122 and transmits and/or receives a radio signal. The base station 110 and/or the user equipment 120 may have a single antenna or multiple antennas.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

In this specification, a specific operation which has been described as being performed by the base station may be performed by an upper node of the base station as the case may be. In other words, it will be apparent that various operations performed for communication with the user equipment in the network which includes a plurality of network nodes along with the base station may be performed by the base station or network nodes other than the base station. The base station may be replaced with terminologies such as a fixed station, Node B, eNode B (eNB), and an access point (AP).

The embodiments according to the present invention may be implemented by various means, for example, hardware, firmware, software, or their combination. If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. A software code may be stored in a memory unit and then may be driven by a processor.

The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above detailed description is to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although the aforementioned method for cancelling interference in a wireless communication and the device therefor have been described based on the 3GPP LTE system, the method and device may be applied to various wireless communication systems in addition to the 3GPP LTE system.

What is claimed is:
1. A method for cancelling interference of a user equipment (UE) in a wireless communication system, the method comprising:
receiving information on subbands of a neighboring cell;
decoding an interference signal of the neighboring cell based on the information on the subbands of the neighboring cell; and
cancelling the interference caused by the neighboring cell from a signal received from a serving cell based on the decoded interference signal, wherein, when different transmission modes (TMs) are used for each of the subbands, the information on the subbands includes bitmap information informing the different TMs for each of the subbands, wherein, when a same TM is used for all of the subbands, the information on the subbands includes 1-bit information informing the same TM used for all of the subbands, and wherein the information on the subbands further includes a duration of a plurality of subframes in which the bitmap information or the 1-bit information is valid.

2. The method according to claim 1, wherein the information on the subbands is information for signaling at least one of information as to whether each of the subbands is a Cell-specific Reference Signal (CRS)-based subband, precoding information on each of the subbands, or rank information on each of the subbands.

3. The method according to claim 1, wherein the information on the subbands is information for signaling a specific subband indicated as a Demodulation Reference Signal (DMRS)-based subband, antenna port information of the neighboring cell corresponding to the specific subband, and DMRS sequence ID.

4. The method according to claim 1, wherein the information on the subbands only indicates information on a specific transmission mode previously signaled in association with a Cell-specific Reference Signal (CRS)-based subband.

5. The method according to claim 1, wherein the information on the subbands includes information for signaling whether at least one of precoding information, rank information or transmission mode information, which are used for each of the subbands, is changed.

6. The method according to claim 1, wherein the information on the subbands includes signaling as to whether each of the subbands is a Cell-specific Reference Signal (CRS)-based subband, and further includes signaling information indicating whether a corresponding signaling is same as a previous signaling or the transmission mode.

7. The method according to claim 1, wherein the information on the subbands includes signaling information indicating that Precoding Matrix Index (PMI) is not defined for a specific subband.

8. The method according to claim 1, wherein the information on the subbands is transmitted through a physical downlink control channel (PDCCH) if a serving cell performs signaling, and is transmitted through an enhanced PDCCH (EPDCCH) if the neighboring cell performs signaling.

9. A user equipment (UE) for performing interference cancellation in a wireless communication system, the UE comprising:

a radio frequency unit; and a processor, wherein the processor is configured to receive information on N subbands of a neighboring cell, wherein N denotes a natural number, decode an interference signal of the neighboring cell based on the information on the subbands of the neighboring cell, and cancel the interference caused by the neighboring cell from a signal which is received from a serving cell based on the decoded interference signal, wherein, when different transmission modes (TMs) are used for each of the subbands, the information on the subbands includes bitmap information informing the different TMs for each of the subbands, wherein, when a same TM is used for all of the subbands, the information on the subbands includes 1-bit information informing the same TM used for all of the subbands, and wherein the information on the subbands further includes a duration of a plurality of subframes in which the bitmap information or the 1-bit information is valid.

* * * * *